United States Patent
Olson

(10) Patent No.: US 10,731,782 B2
(45) Date of Patent: Aug. 4, 2020

(54) ADJUSTABLE PIPE

(71) Applicant: ACCESSIBLE SYSTEMS, INC., Plymouth, MN (US)

(72) Inventor: Arden Olson, Maple Grove, MN (US)

(73) Assignee: Accessible Systems, Inc., Plymouth, MN (US)

( * ) Notice: Subject to any disclaimer, the term of this patent is extended or adjusted under 35 U.S.C. 154(b) by 571 days.

(21) Appl. No.: 15/388,807

(22) Filed: Dec. 22, 2016

(65) Prior Publication Data

US 2018/0180205 A1   Jun. 28, 2018

(51) Int. Cl.
*F16L 27/12*   (2006.01)
*E03C 1/14*   (2006.01)

(52) U.S. Cl.
CPC ............... *F16L 27/12* (2013.01); *E03C 1/14* (2013.01); *F16L 27/125* (2013.01)

(58) Field of Classification Search
CPC ..... F16L 27/12; F16L 27/125; F16L 27/0816; E03C 1/14
USPC ...................... 285/302; 4/650, 651, 679–687
See application file for complete search history.

(56) References Cited

U.S. PATENT DOCUMENTS

| | | | |
|---|---|---|---|
| 381,803 A * | 4/1888 | Marquis | F16L 27/12 285/302 |
| 576,945 A * | 2/1897 | Brenneman | F16L 17/10 277/605 |
| 1,707,312 A * | 4/1929 | McDaniel | F16L 27/12 277/500 |
| 2,521,127 A * | 9/1950 | Price | F16L 27/12 285/231 |
| 2,958,871 A | 11/1960 | Eskenazi et al. | |
| 3,456,264 A | 7/1969 | Flagg | |
| 4,083,409 A * | 4/1978 | Barrington | E21B 34/108 166/320 |
| 4,195,538 A * | 4/1980 | Brown | B23Q 5/40 285/302 |
| 4,821,347 A | 4/1989 | Nash | |
| 5,145,215 A * | 9/1992 | Udell | F01N 13/1816 285/226 |
| 5,867,847 A | 2/1999 | Klawitter et al. | |
| 5,893,396 A | 4/1999 | Vagle | |

(Continued)

FOREIGN PATENT DOCUMENTS

| | | | |
|---|---|---|---|
| CA | 1135747 A  * | 11/1982 | ............ F16L 27/125 |
| CA | 1135747 A1 * | 11/1982 | |

(Continued)

*Primary Examiner* — David Bochna
*Assistant Examiner* — James A Linford
(74) *Attorney, Agent, or Firm* — Mueting Raasch Group

(57) ABSTRACT

An adjustable pipe and methods for manufacturing and installing the same may include at least two pipes, a seal structure and a base coupling. The adjustable pipe may be for fluid connection between a first object and a second object. The at least two pipes may include a first pipe and a second pipe that is configured to be received by at least a portion of the first pipe. The adjustable pipe may also include a first inner collar proximate the first end of the first pipe and a second outer collar proximate the second end of the second pipe. The seal structure may be provided between the first pipe and the second pipe and between the first end of the first pipe and the second outer collar proximate the second end of the second pipe.

21 Claims, 14 Drawing Sheets

(56) References Cited

U.S. PATENT DOCUMENTS

| | | | |
|---|---|---|---|
| 6,170,096 B1 | 1/2001 | Rasmussen | |
| 2016/0131289 A1* | 5/2016 | Spears | F16L 27/12 285/302 |

FOREIGN PATENT DOCUMENTS

| | | | | |
|---|---|---|---|---|
| FR | 2910953 A1 * | 7/2008 | | E03D 11/14 |
| JP | 04034288 A * | 2/1992 | | |
| JP | 2591664 B2 * | 3/1997 | | |
| JP | 2591664 Y2 * | 3/1999 | | F16L 27/12 |

\* cited by examiner

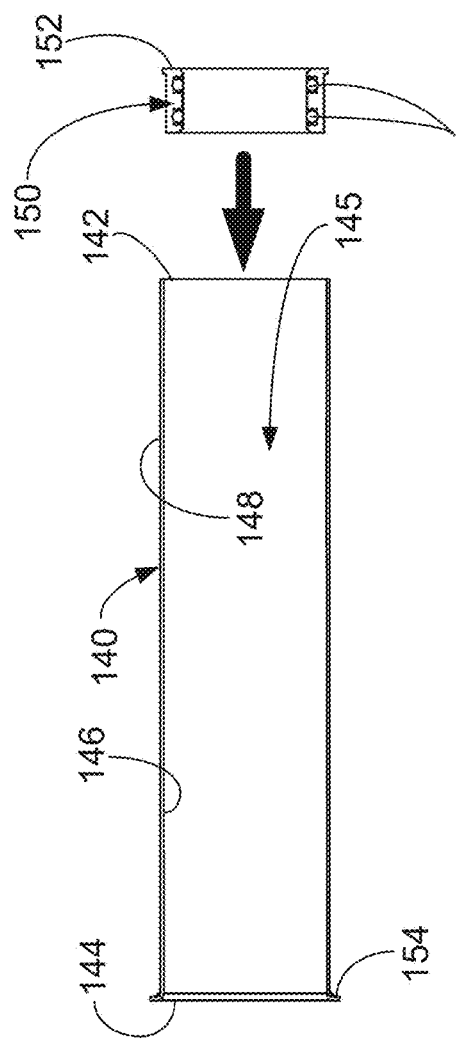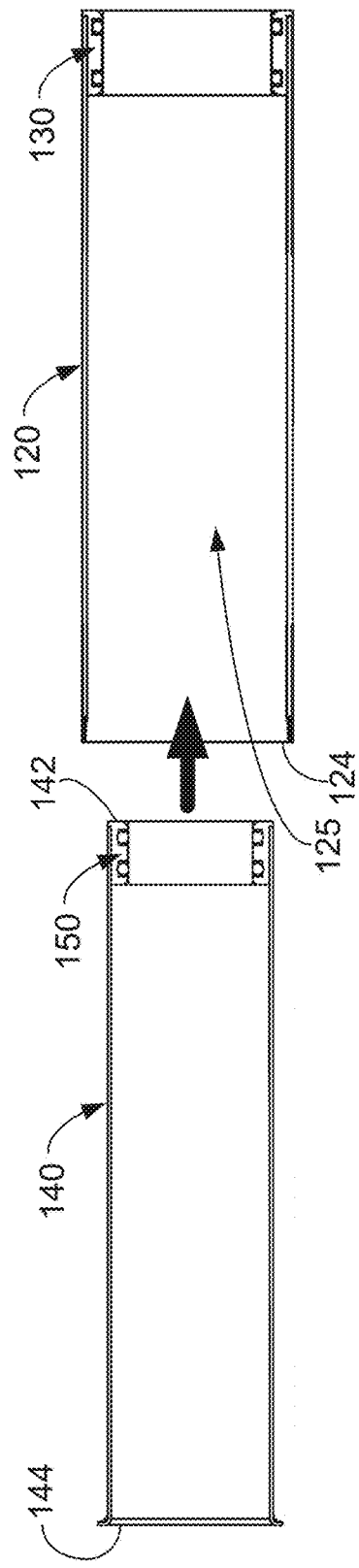

ADJUSTABLE PIPE

BACKGROUND

The present disclosure relates generally to an adjustable pipe that provides at least a portion of fluid connection between a first object (e.g., sink, basin, tub, toilet, drain, etc.) and a second object (e.g., additional pipe, trap pipe, P-trap, building plumbing, etc.). Thereby, the first object (e.g., a sink) may be moved relative to the second object (e.g., a waste pipe fixed to the floor/wall) to adjust the height of the first object relative to the second object while still maintaining a fluid connection between each.

The ability to adjust the height of a sink, or any other receptacle, may be useful by people of varying heights or those limited by physical disabilities. For example, a child may need to use the same sink as an adult. Also, for example, people restricted to a wheelchair may need to use the same sink as people not restricted to a wheelchair and the ability to adjust the sink to an appropriate height for the wheelchair may be desirable.

Further, it may be desirable to adjust the height of a sink in order to shampoo the hair of a person restricted to a wheelchair. Usually, shampoo sink bowls are designed with a large opening in the front to accommodate the head and neck of a person leaning backwards and are positioned at a fixed height. Because the sink bowl is typically at a fixed height, it is often the chair that moves up and down to accommodate the sink bowl height. Someone restricted to a wheelchair may not be easily moved to a chair that moves up and down relative to a sink bowl, and therefore it may be desirable for the sink bowl to instead move relative to the wheelchair to accommodate a variety of different individuals in a variety of different wheelchairs.

The current variations of adjustable pipes include flexible tubing or "accordion style" plumbing adaptors that have flexible sidewalls such that the flexible portion may be expanded and contracted to adjust the height. However, the flexible tubing or "accordion style" plumbing adaptors may retain solids in the non-smooth walls and may not be up to certain building codes. Additionally, a "Height Adjustable Standpipe" is described in U.S. Pat. No. 5,893,396, which includes multiple sections that fluidly cooperate with drain assemblies or fixtures. The multiple sections may be held in position relative to one another using cables such that the multiple sections are prevented from coming apart. Further, the multiple sections may alternate between brass and PVC pipe to allow for grooves to be formed in the PVC pipes such that the grooves may include O-rings that provide a seal between sections.

SUMMARY

An adjustable pipe including at least two pipes may be used to provide an adjustable fluid connection between, e.g., a sink bowl and an outlet/waste pipe. The at least two pipes may move relative to one another (e.g., between a collapsed configuration and an extended configuration) to provide various distances between an inlet and an outlet of the adjustable pipe. The present disclosure provides one or more apparatus or methods for providing a robust adjustable fluid connection (e.g., an adjustable pipe).

An exemplary adjustable pipe for fluid connection between a first object and a second object may include at least two pipes a first inner collar, a second outer collar, a seal structure, and a base coupling. The at least two pipe may extend along a pipe axis between a first end and a second end, and the at least two pipe may include a first pipe and a second pipe. The first pipe may extend between a first end and a second end. The first pipe may define an inner surface and an outer surface opposite the inner surface. The inner surface of the first pipe may define a passageway between the first and second ends of the first pipe. The second pipe may extend between a first end and a second end. The second pipe may define an inner surface and an outer surface opposite the inner surface. The inner surface of the second pipe may define a passageway between the first and second ends of the second pipe. At least a portion of the second pipe may be configured to be received by at least a portion of the passageway of the first pipe. The first inner collar may extend towards the pipe axis and may be proximate the first end of the first pipe. The second outer collar may extend away from the pipe axis and may be proximate the second end of the second pipe.

The seal structure may be provided between the inner surface of the first pipe and the outer surface of the second pipe. The seal structure may be between the first end of the first pipe and the second outer collar proximate the second end of the second pipe. The seal structure may include one or more sealing elements configured to provide a seal between the first and second pipes. The base coupling may be connected to one of the first and second ends of the at least two pipes. The base coupling may be configured for use in coupling the adjustable pipe to the second object. The other of the first and second ends of the at least two pipes may be configured for use in coupling the adjustable pipe to the first object.

In one or more embodiments, the seal structure may include the first inner collar proximate the first end of the first pipe. In one or more embodiments, the first pipe may define the first inner collar at the first end of the first pipe. In one or more embodiments, the at least two pipes may also include a third pipe extending between a first end and a second end. The third pipe may define an inner surface and an outer surface opposite the inner surface. The inner surface of the third pipe may define a passageway between the first and second ends of the third pipe. At least a portion of the third pipe may be configured to be received by at least a portion of the passageway of the second pipe. The adjustable pipe may further include a second inner collar, a third outer collar and an additional seal structure. The second inner collar may extend towards the pipe axis and may be proximate the first end of the second pipe. The third outer collar may extend away from the pipe axis and may be proximate the second end of the third pipe. The additional seal structure may be provided between the inner surface of the second pipe and the outer surface of the third pipe. The additional seal structure may also be provided between the first end of the second pipe and the third outer collar proximate the second end of the third pipe. The additional seal structure may include one or more sealing elements configured to provide a seal between the second and third pipes.

In one or more embodiments, the additional seal structure may include the second inner collar proximate the first end of the second pipe. In one or more embodiments, the second pipe may define the second inner collar at the first end of the second pipe. In one or more embodiments, the adjustable pipe may also include a first object coupling configured for use in coupling the adjustable pipe to the first object. The first object coupling may be connected to the first end of the third pipe. In one or more embodiments, the base coupling may be connected to the second end of the first pipe. In one or more embodiments, the base coupling may define a second end inner collar of the first pipe. The second end inner collar of the first pipe may extend towards the pipe axis and may be proximate the second end of the first pipe. In one or more embodiments, the second outer collar at the second end of the second pipe may be configured to move within the first pipe. The second outer collar at the second end of the second pipe may be stopped by contact with the second end inner collar of the first pipe.

In one or more embodiments, the one or more sealing elements of the seal structure may include a first O-ring and a second O-ring. A distance between the first and second O-rings of the seal structure may be fixed. In one or more embodiments, the seal structure may define an inner surface and an outer surface opposite the inner surface. The inner surface of the seal structure may face the outer surface of the second pipe and the outer surface of the seal structure may face the inner surface of the first pipe. Two grooves may be defined in the inner surface of the seal structure. Each of the first and second O-rings of the seal structure may be positioned in a different groove of the two grooves such that each of the first and second O-rings may contact the outer surface of the second pipe. In one or more embodiments, the at least two pipes may be configurable between a collapsed configuration and an extended configuration. The at least two pipes may extend a greater length along the pipe axis when in extended configuration than when in the collapsed configuration.

An exemplary method of installing an adjustable pipe between a first object and a second object may include providing an adjustable pipe, coupling one of a first and second ends of at least two pipes of the adjustable pipe to a second object, and coupling the other of the first and second ends of the at least two pipes to a first object. The adjustable pipe may include at least two pipes, a first inner collar, a second outer collar, and a seal structure. The at least two pipes may extend along a pipe axis between a first end and a second end, and may include a first pipe and a second pipe. The first pipe may extend between a first end and a second end. The first pipe may define an inner surface and an outer surface opposite the inner surface. The inner surface of the first pipe may define a passageway between the first and second ends of the first pipe. The second pipe may extend between a first end and a second end. The second pipe may define an inner surface and an outer surface opposite the inner surface. The inner surface of the second pipe may define a passageway between the first and second ends of the second pipe. At least a portion of the second pipe may be configured to be received by at least a portion of the passageway of the first pipe. The first inner collar may extend towards the pipe axis and may be proximate the first end of the first pipe. The second outer collar may extend away from the pipe axis and may be proximate the second end of the second pipe. The seal structure may be provided between the inner surface of the first pipe and the outer surface of the second pipe. The seal structure may also be provided between the first end of the first pipe and the second outer collar proximate the second end of the second pipe. The seal structure may include one or more sealing elements configured to provide a seal between the first and second pipes.

In one or more embodiments, the coupling one of the first and second ends of the at least two pipes to the second object may include coupling a pipe thread connected to the second end of the at least two pipes to the second object. In one or more embodiments, the coupling the other of the first and second ends of the at least two pipes to the first object may include coupling a slip nut connected to the first end of the at least two pipes to the first object.

An exemplary method of manufacturing an adjustable pipe extending along a pipe axis for connection between a first object and a second object may include providing a first pipe extending between a first end and a second end. The first pipe may define an inner surface and an outer surface opposite the inner surface. The inner surface of the first pipe may define a passageway between the first and second ends of the first pipe. The method of manufacturing may also include inserting a seal structure through the passageway of the first pipe. The seal structure may include one or more sealing elements. A first inner collar may extend towards the pipe axis and is proximate the first end of the first pipe. The method of manufacturing may further include providing a second pipe extending between a first end and a second end. The second pipe may define an inner surface and an outer surface opposite the inner surface. The inner surface of the second pipe may define a passageway between the first and second ends of the second pipe. Additionally, the method of manufacturing may include inserting an additional seal structure through the passageway of the second pipe. The additional seal structure may include one or more sealing elements. A second inner collar may extend towards the pipe axis and is proximate the first end of the second pipe.

The method of manufacturing may also include inserting the second pipe through the passageway of the first pipe and the seal structure after inserting the seal structure through the first end of the first pipe. A second outer collar may extend away from the pipe axis and proximate the second end of the second pipe. The seal structure may be provided between the inner surface of the first pipe and the outer surface of the second pipe. The seal structure may also be provided between the first end of the first pipe and the second outer collar proximate the second end of the second pipe. The one or more sealing elements of the seal structure may be configured to provide a seal between the first and second pipes. Further, the method of manufacturing may include inserting a third pipe through the passageway of the second pipe and the additional seal structure. The third pipe may extend between a first end and a second end. The third pipe may define an inner surface and an outer surface opposite the inner surface. The inner surface of the third pipe may define a passageway between the first and second ends of the third pipe.

The method of manufacturing may also include attaching a third outer collar proximate the second end of the third pipe after inserting the third pipe through the first end of the second pipe and the additional seal structure. The third outer collar proximate the second end of the third pipe may extend away from the pipe axis. The additional seal structure may be provided between the inner surface of the second pipe and the outer surface of the third pipe. The additional seal structure may also be provided between the first end of the second pipe and the third outer collar proximate the second end of the third pipe. The one or more sealing elements of the additional seal structure may be configured to provide a seal between the second and third pipes. The method or manufacturing may further include connecting a base coupling to the second end of the first pipe after attaching the third outer collar proximate the second end of the third pipe. The base coupling may be configured for use in coupling the adjustable pipe to the second object.

In one or more embodiments, the method of manufacturing may also include fixing the additional seal structure to the second pipe proximate the first end of the second pipe. In one or more embodiments, the method of manufacturing may further include providing a slip nut at the first end of the third pipe before inserting the third pipe through the first end of the second pipe and the additional seal structure. The slip nut may be configured for use in coupling the adjustable pipe to the first object. In one or more embodiments, the method of manufacturing may also include fixing the seal structure to the first pipe proximate the first end of the first pipe.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIGS. 11A-11G are cross-sectional side views of the adjustable pipe of FIGS. 1-9 that illustrate an exemplary method of manufacturing the adjustable pipe for connecting between a first object and a second object.

DETAILED DESCRIPTION OF EXEMPLARY EMBODIMENTS

Figure 1:
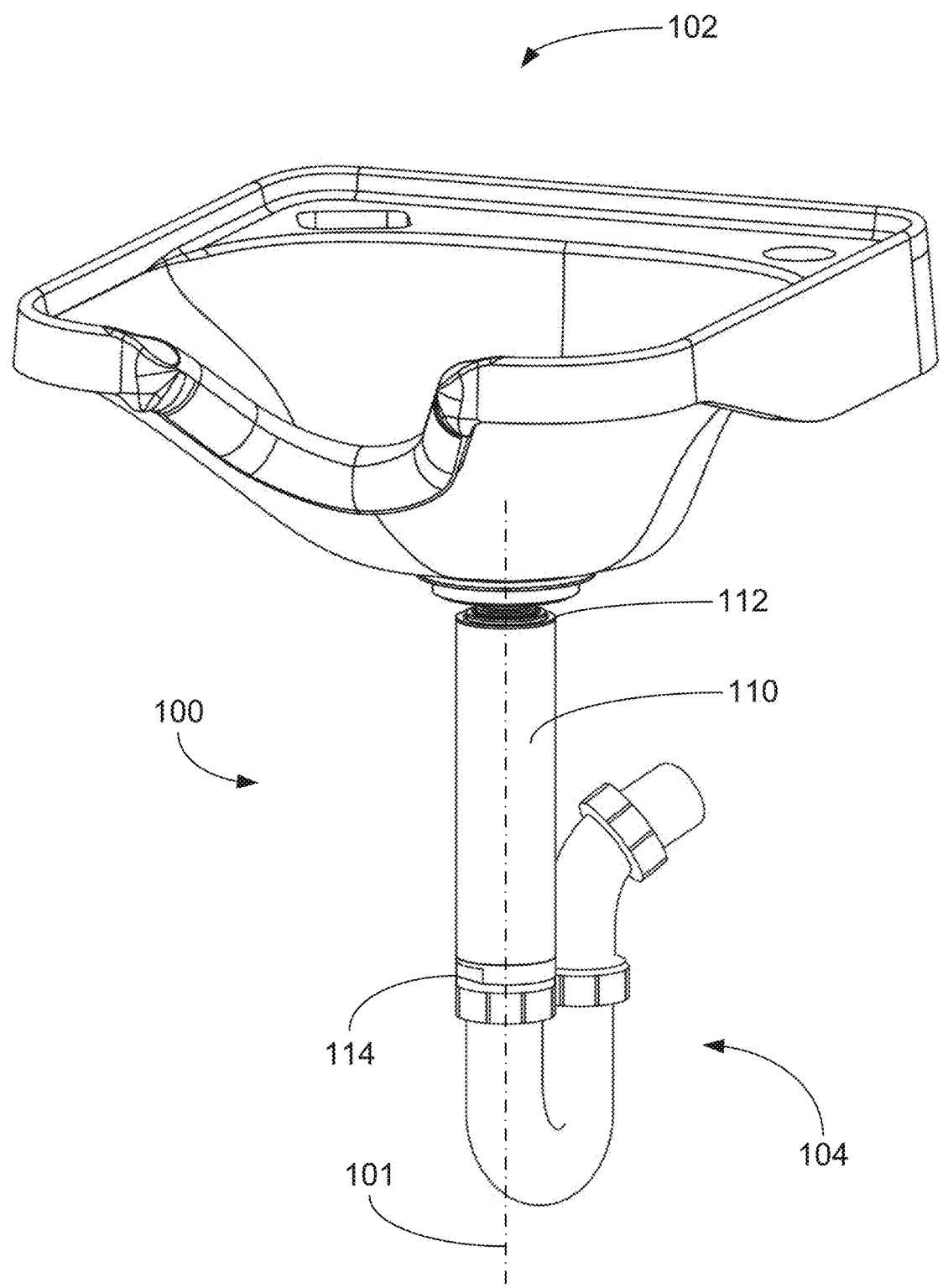
FIG. 1 is a perspective view of an exemplary adjustable pipe, in a collapsed configuration, fluidly connected between a first object and a second object.

In the following detailed description of illustrative embodiments, reference is made to the accompanying figures of the drawing, which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus, systems, structures, and methods shall be described with reference to FIGS. 1-11. It will be apparent to one skilled in the art that elements from one embodiment may be used in combination with elements of the other embodiments, and that the possible embodiments of such apparatus and systems using combinations of features set forth herein is not limited to the specific embodiments shown in the Figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

The present disclosure relates generally to an adjustable pipe for at least a portion of fluid connection between a first object and a second object. An adjustable pipe (e.g., a telescoping standpipe, which may also be known as a sink tailpiece) may allow for the distance between the first and second objects to be adjusted to a desirable distance. For example, the first object may include a sink bowl and the second object may include an outlet/waste pipe. The adjustability of the adjustable pipe may allow the sink bowl to be adjusted to different heights for different applications. At the same time, the adjustable pipe may provide a reliable and sanitary connection between the sink bowl and the outlet/waste pipe that also satisfies building codes.

For example, the adjustable pipe may include multiple pipe portions that extend within (e.g., collapse inside) one another and move relative to one another to provide a continuous adjustable pipe for the passage of fluid. The multiple pipe portions may move such that the adjustable pipe may be fully extended (e.g., with minimal overlap between each pipe portion), fully collapsed (e.g., the majority of each pipe portion overlapping), or somewhere therebetween. The multiple pipe portions may also have one or more gaskets (e.g., sealing elements, O-rings) between each of the multiple pipe portions that overlap. Therefore, regardless of how far the adjustable pipe may be extended or collapsed, the multiple pipe portions are positioned to maintain a robust seal between the interior of the adjustable pipe and the exterior of the adjustable pipe.

The top pipe portion of the multiple pipe portions may include or be associated with a slip nut to attach a sink outlet or basket (of a sink bowl). Also, the bottom pipe portion of the multiple pipe portions may include or be associated with a pipe thread in a standard size to allow attachment of traps or other drain piping. As such, when the multiple pipe portions are collapsed on one another, the adjustable pipe may be short enough to be used in retrofit situations where the waste piping already exists through the wall.

Further, the multiple pipe portions may include collars that prevent one pipe portion from moving past another pipe portion and, e.g., completely detaching from one another. The collars may be positioned proximate either of the ends of each pipe portion of the multiple pipe portions and may interact with other collars or components of the multiple pipe portions to restrict some motion of the multiple pipe portions. Various exemplary objects and advantages of the adjustable pipe and methods corresponding to the adjustable pipe may become apparent from the following detailed description and drawings.

Figure 2:
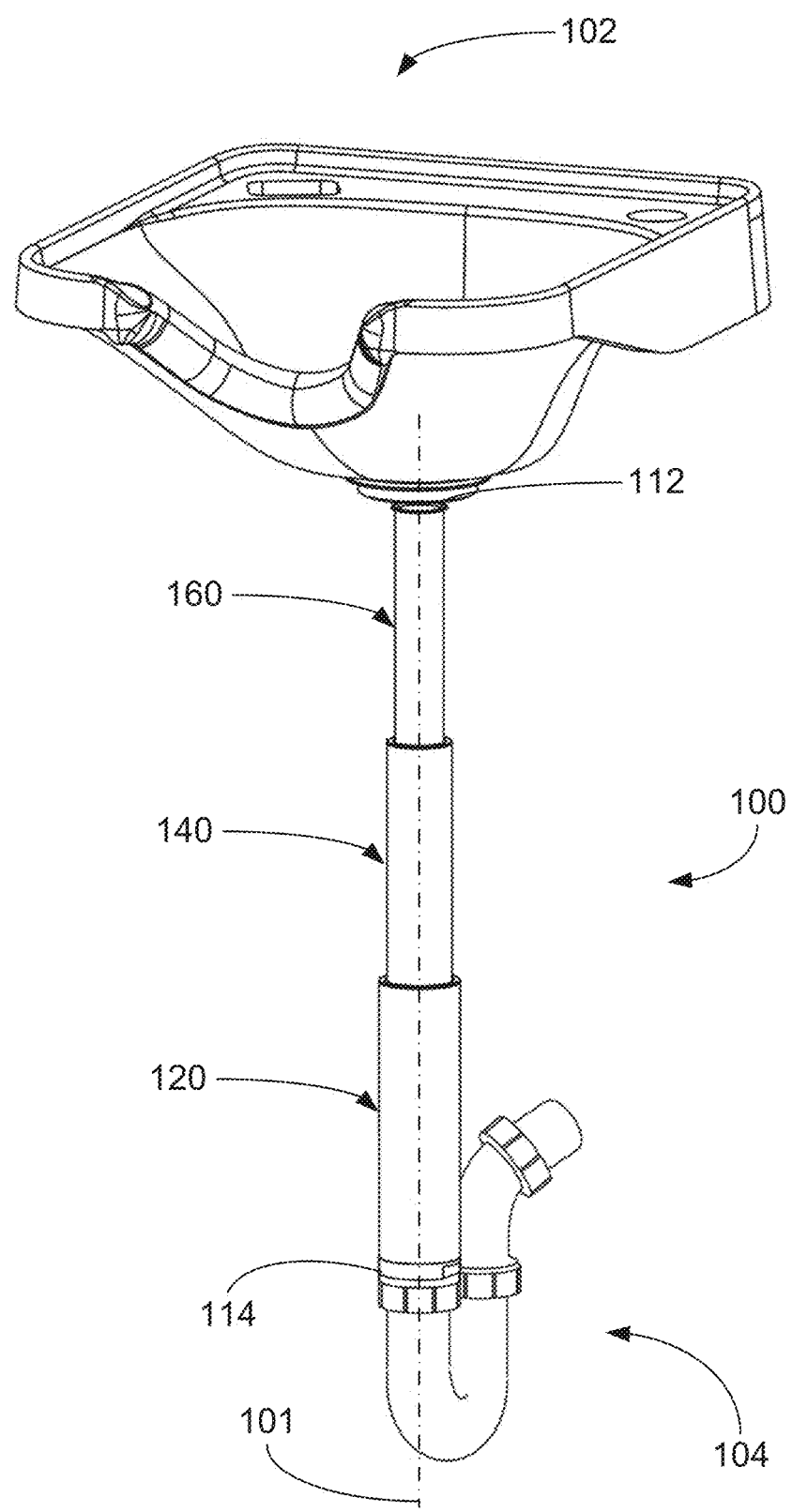
FIG. 2 is a perspective view of the exemplary adjustable pipe of FIG. 1, in an extended configuration, fluidly connected between the first object and the second object.

An exemplary adjustable pipe 100, fluidly connected between a first object 102 and a second object 104, is shown in FIGS. 1 and 2. The first and second objects 102, 104 may include a variety of different things. For example, the first object 102 may include a sink bowl, a basin, a reservoir, a tub, a toilet, a basket, a sink outlet, etc. In other words, the first object 102 may be any suitable receptacle for containing fluids and including a drain through which any fluids may pass (e.g., with the drain attachable to the adjustable pipe 100) or any other object through which fluid (e.g., liquid or gas) may pass. Also, for example, the second object 104 may include an exit pipe, an outlet pipe, an additional pipe, a trap pipe, P-trap, building plumbing, etc. or any other pipe or object for transporting fluid (e.g., liquid or gas) away from the adjustable pipe. Specifically, as shown in FIGS. 1 and 2, the first object 102 is a sink bowl and the second object 104 is a trap pipe or outlet pipe.

The adjustable pipe 100 may include at least two pipes 110 extending along a pipe axis 101 between a first end 112 and a second end 114. The first and second objects 102, 104 may be coupled (e.g., fluidly coupled or connected) to the adjustable pipe 100 at opposing ends (e.g., the first and second ends 112, 114). For example, the first object 102 may be coupled to the adjustable pipe 100 proximate the first end 112 of the adjustable pipe 100 and the second object 104 may be coupled to the adjustable pipe 100 proximate the second end 114 of the adjustable pipe 100. In other embodiments, the first object 102 may be coupled to the adjustable pipe 100 proximate the second end 114 and the second object 104 may be coupled to the adjustable pipe 100 proximate the first end 112.

The first and second objects 102, 104 may be coupled to the adjustable pipe 100 in any suitable way that creates a fluid connection or seal between the first and second objects 102, 104 and the adjustable pipe 100. For example, the first and second objects 102, 104 may be coupled to the adjustable pipe 100 by a slip nut, threads, weld, adhesive, etc. or any combination thereof. As described further herein, the first and second objects 102, 104 may be coupled to the adjustable pipe 100 in a variety of different ways, e.g., removably coupled and/or fixed.

The adjustable pipe 100 may include multiple pipe portions that, e.g., overlap, engage, telescope, or receive one another to produce the adjustable pipe 100. For example, the adjustable pipe 100 may include two pipe portions, three pipe portions, four pipe portions, five pipe portions, or greater than five pipe portions. Each of the pipe portions may be aligned end to end and at least partially received by one another to define a common fluid passageway. As described herein, the adjustable pipe 100 may include at least two pipes 110. The at least two pipes 110 may define any suitable cross-sectional shape including a passageway or aperture. For example, the at least two pipes 110 may define a cross-sectional shape that may be annular and/or may define an outer surface shape of the cross-sectional shape that may be circular, square, triangular, polygonal, etc. Specifically, the at least two pipes 110 may be generally cylindrical in shape along the pipe axis 101.

The at least two pipes 110 may include a variety of different materials. For example, the at least two pipes 110 may include (e.g., be formed of) one or more materials such as, e.g., brass, plastic, metal, polyvinyl chloride (PVC), stainless steel, etc. Preferably, the at least two pipes 110 may include (e.g., be formed of) brass. All of the at least two pipes 110 may be all the same material or different pipes of the at least two pipes 110 may be different materials. The at least two pipes 110 may be formed through one or more processes. For example, the at least two pipes 110 may be formed through molded processes (e.g., injection molding), machining, 3d printing, etc.

The at least two pipes 110 may move relative to another (e.g., while still maintaining a fluid passage therethrough) such that the at least two pipes 110 (e.g., the adjustable pipe 100) may be configurable between an extended configuration and a collapsed configuration. Any structure attached to the at least to pipes 110 (e.g., at the first end 112 or the second end 114) may move along with the at least two pipes 110. As shown in FIG. 1, the at least two pipes 110 (e.g., the adjustable pipe 100) are in a collapsed configuration/position. Also, as shown in FIG. 2, the at least two pipes 110 (e.g., the adjustable pipe 100) are in an extended configuration/position. The at least two pipes 110 may also be configured in any position therebetween (e.g., between the collapsed configuration and the extended configuration).

The at least two pipes 110 may stay in position (e.g., at the collapsed configuration, at the extended configuration, or somewhere therebetween) in a variety of different ways. For example, the at least two pipes 110 are moved relative to one another due to movement of other components (e.g., the first or second objects 102, 104) attached to the at least two pipes 110. For example, the first object 102 may be supported and moved up and down such that the adjustable pipe 100 extends and retracts with the first object 102 to maintain the fluid connection between the first and second objects 102, 104. In one or more embodiments, during extension, one pipe of the at least two pipes 110 may move first due to a lower friction of the associated seals (e.g., because of a smaller diameter of an O-ring), followed by extension of the other pipes. The same may be true with regard to retraction of the at least two pipes 110 (e.g., the pipes with the lowest friction may move relative to one another first due to movement of the first or second objects 102, 104). In other embodiments, the at least two pipes 110 may hold a position relative to one another (while still sliding relative to one another) by fastener, pin, interference fit, friction, etc. Specifically, the at least two pipes 110 maintain position relative to one another (e.g., in the collapsed configuration, in the extended configuration, or somewhere in between) due to friction between the at least two pipes 110, portions thereof, and/or elements associated with such pipes or portions thereof (e.g., seal structures).

Figure 3:
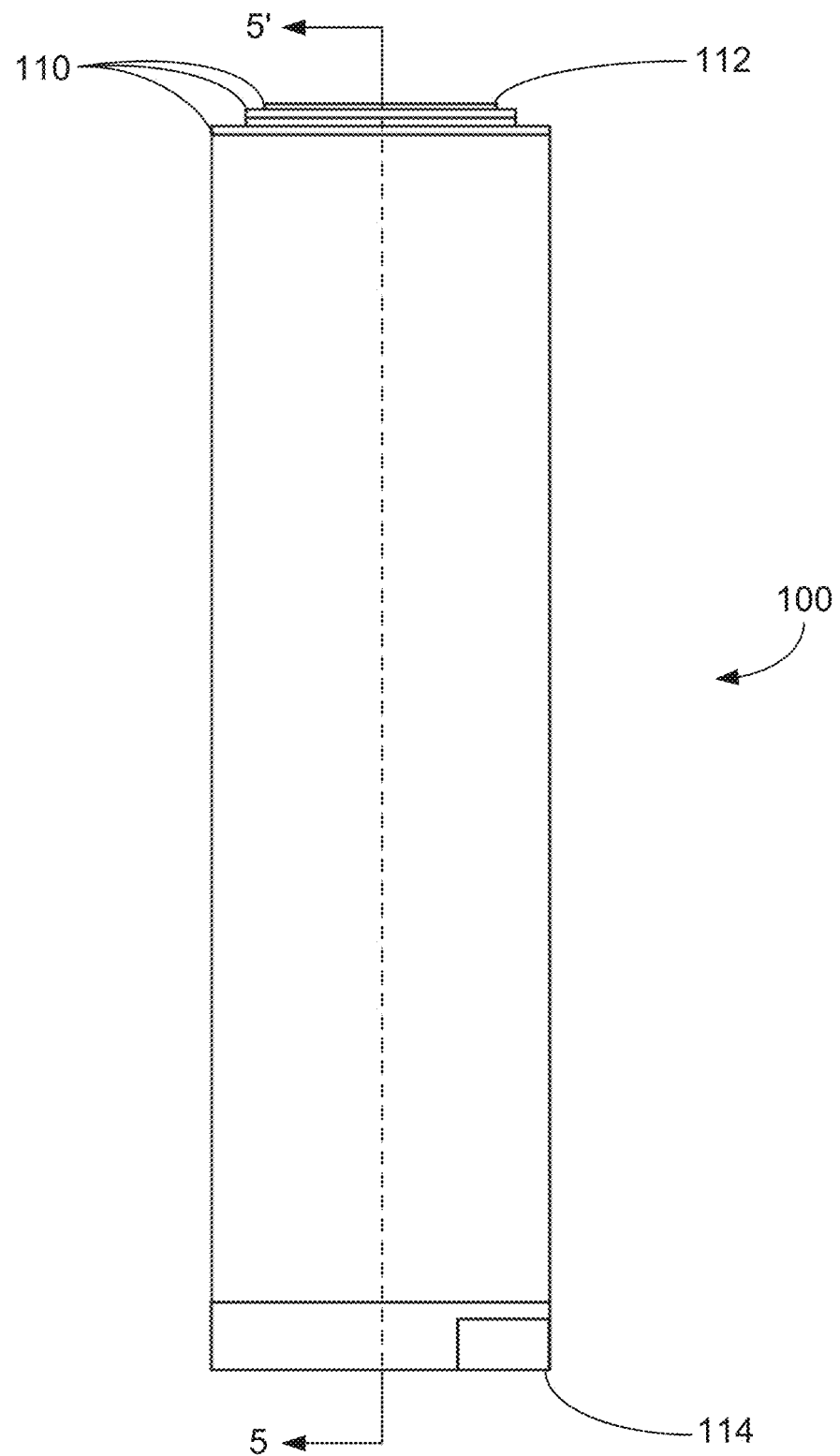
FIG. 3 is a side view of an exemplary adjustable pipe in a collapsed configuration.
Figure 4:
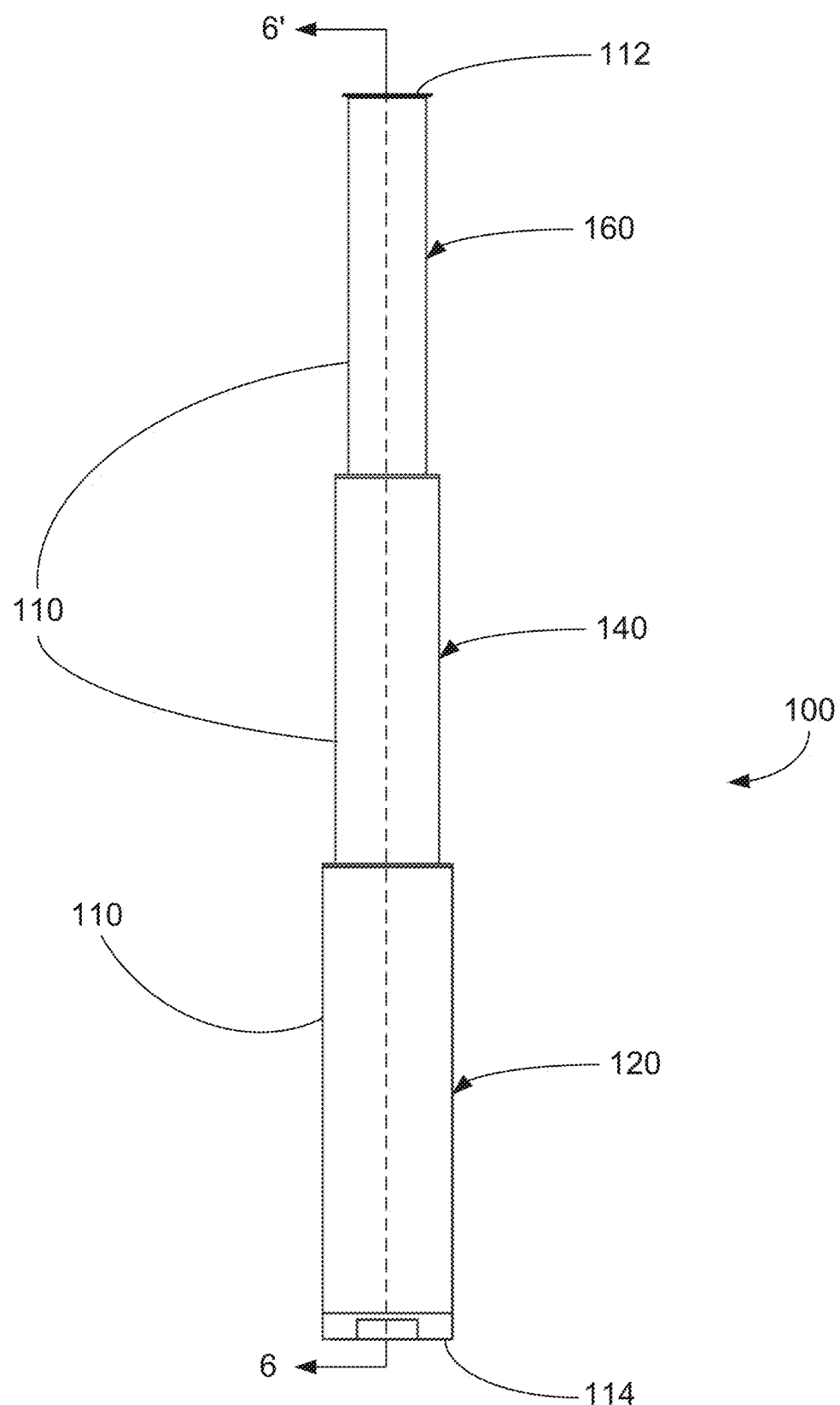
FIG. 4 is side view of the exemplary adjustable pipe of FIG. 3 in an extended configuration.

The adjustable pipe 100 may extend a greater length along the pipe axis 101 when the at least two pipes 110 are in an extended configuration (e.g., as shown in FIG. 4), than when the at least two pipes 110 are in the collapsed configuration (e.g., as shown in FIG. 3). For example, the adjustable pipe 100 may define a length when in the extended configuration, e.g., measured between the first end 112 and the second end 114, of about greater than or equal to 12 inches, greater than or equal to 16 inches, greater than or equal to 20 inches, greater than or equal to 24 inches, etc. and/or less than or equal to 40 inches, less than or equal to 35 inches, less than or equal to 30 inches, less than or equal to 25 inches, etc. Also, for example, the adjustable pipe 100 may define a length when in the collapsed configuration, e.g., measured between the first end 112 and the second end 114, of about greater than or equal to 3 inches, greater than or equal to 5 inches, greater than or equal to 8 inches, greater than or equal to 10 inches, etc. and/or less than or equal to 20 inches, less than or equal to 16 inches, less than or equal to 12 inches, less than or equal to 9 inches, etc. The adjustable pipe 100 may cover an extension distance (e.g., range of extension) of about 5 inches to about 35 inches.

The at least two pipes 110 may include any number of pipes. For example, the at least two pipes 110 may include two pipes, ten pipes, or any number therebetween. The height of the adjustable pipe 100 may depend on the height of individual pipes for the minimum height (e.g. in a collapsed configuration) and the height of individual pipes and number of pipes for the maximum height (e.g., in an extended configuration). For example, the minimum height of the at least two pipes 110 is at least as long as the longest pipe of the at least two pipes 110. Also, for example, the maximum height of the at least two pipes 110 is less than the length of each of pipe of the at least two pipes 110 combined (e.g., due to overlap of the pipes). Various combinations of the number of pipes and pipe lengths may be used for various applications. For example, if a large distance range is needed along with a small minimum height, a large number of short pipes may be necessary. On the other hand, for example, if a large distance range is needed, but the minimum height can be larger, two long pipes may be used.

The at least two pipes 110 may include a first pipe 120, a second pipe 140, and a third pipe 160 as shown, e.g., in FIGS. 2 and 4. Each of the first, second, and third pipes 120, 140, 160 may be received within one another to create a continuous passage between the first end 112 of the at least two pipes 110 and the second end 114 of the at least two pipes 110. As shown in FIG. 2, the at least two pipes 110 may be oriented such that the pipe (e.g., a first pipe) closer to the first object 102 may be inserted into the adjacent pipe (that is farther from the first object 102, e.g., a second pipe). Such orientation may allow fluid to pass (downward due to gravity) unobstructed through the at least two pipes 110 (e.g., from the first pipe to the second pipe). For example, fluid may pass from the end of the first pipe into the middle of the connected pipe (e.g., the second pipe) such that fluid does not flow towards the interface or gap between the pipes. On the other hand, if the orientation was reversed (e.g., such that the bottom pipe was inserted into the top pipe), the fluid may flow (downward due to gravity) towards the interface or gap between the pipes such that the fluid may, e.g., have a higher likelihood of leaking out of the pipe connections and/or interfaces.

Figure 5:
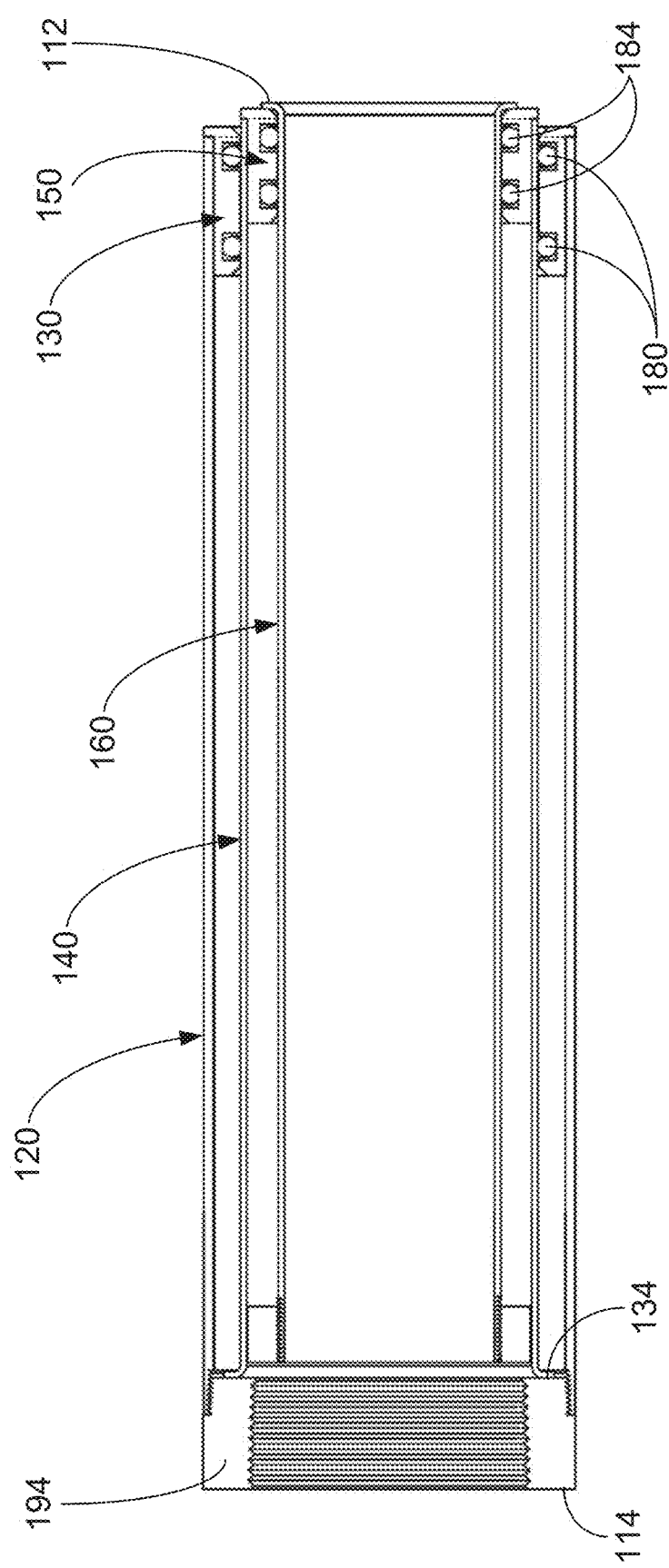
FIG. 5 is a cross-sectional side view taken across line 5-5' of the exemplary adjustable pipe of FIG. 3 in the collapsed configuration.
Figure 6:
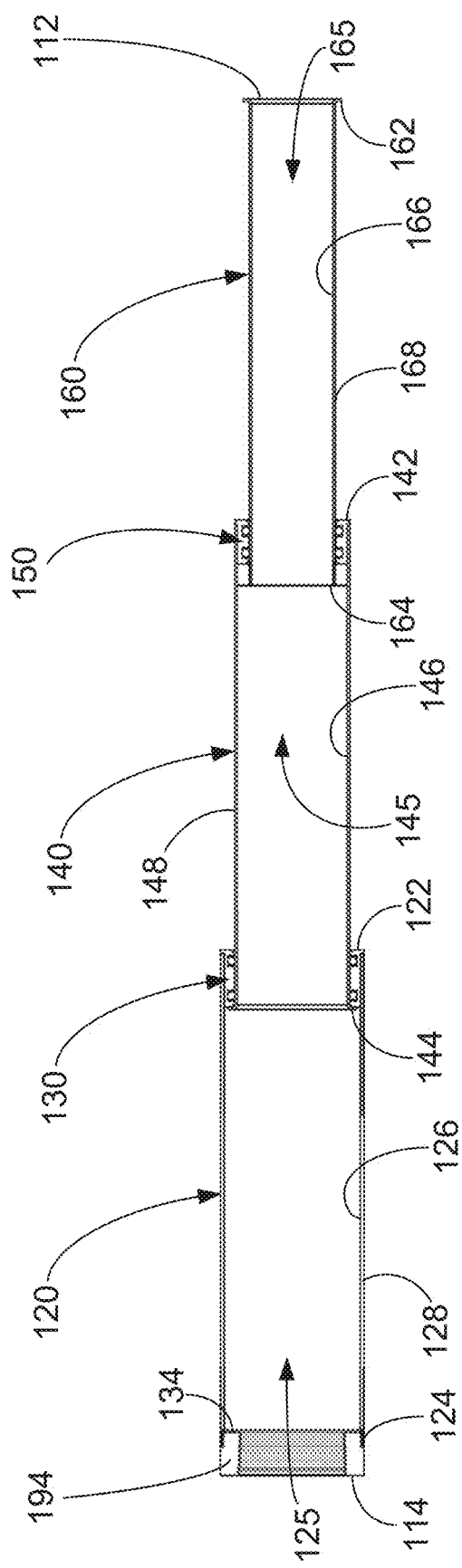
FIG. 6 is a cross-sectional side view taken across line 6-6' of the exemplary adjustable pipe of FIG. 4 in the extended configuration.

FIG. 5 illustrates a cross-sectional view (e.g., taken across line 5-5' of FIG. 3) of the at least two pipes 110 in the collapsed configuration and FIG. 6 illustrates a cross-sectional view (e.g., taken across line 6-6' of FIG. 4) of the at least two pipes 110 in the extended configuration. The first pipe 120 may extend between a first end 122 and a second end 124 as shown in FIG. 6. The first pipe 120 may define an inner surface 126 and an outer surface 128 opposite the inner surface 126. The inner surface 126 of the first pipe 120 may define a passageway 125 between the first and second ends 122, 124 of the first pipe 120. For example, the first pipe 120 may define openings at each of the first and second ends 122, 124 that are connected by the passageway 125 such that fluids may pass through the passageway 125 between the first and second ends 122, 124 of the first pipe 120.

The second pipe 140 may extend between a first end 142 and a second end 144 as shown in FIG. 6. The second pipe 140 may define an inner surface 146 and an outer surface 148 opposite the inner surface 146. The inner surface 146 of the second pipe 140 may define a passageway 145 between the first and second ends 142, 144 of the second pipe 140. For example, the second pipe 140 may define openings at each of the first and second ends 142, 144 that are connected by the passageway 145 such that fluids may pass through the passageway 145 between the first and second ends 142, 144 of the second pipe 140.

As shown in FIG. 6, at least a portion of the second pipe 140 may be configured to be received by at least a portion of the first pipe 120 (e.g., within the passageway 125 of the first pipe 120). For example, the first end 122 of the first pipe 120 may partially overlap the second end 144 of the second pipe 140. In other words, the inside diameter of the first pipe 120 (e.g., proximate the first end 122) may be greater than or equal to the outside diameter of the second pipe 140 (e.g., proximate the second end 144) to allow the second pipe 140 to be received by the first pipe 120. The inside diameter of the first pipe 120 may be about, e.g., greater than or equal to 1 inch, greater than or equal to 1.25 inches, greater than or equal to 1.5 inches, greater than or equal to 2 inches, etc. and/or less than or equal to 5 inches, less than or equal to 4 inches, less than or equal to 3 inches, less than or equal to 2.5 inches, etc., and the outside diameter of the second pipe 140 may be about, e.g., greater than or equal to 1 inch, greater than or equal to 1.25 inches, greater than or equal to 1.5 inches, greater than or equal to 2 inches, etc. and/or less than or equal to 5 inches, less than or equal to 4 inches, less than or equal to 3 inches, less than or equal to 2.5 inches, etc. In one or more embodiments, the smaller pipe may be sized to attach to a fixture (e.g., the first or second object 102, 104) and be sized accordingly, while the other pipe (e.g., slightly larger pipe through which the smaller pipe is inserted) may be a little larger to accept the smaller pipe.

Any of the at least two pipes 110 may overlap at least a set distance to ensure a robust and sealed connection between each pipe of the at least two pipes 110. For example, the at least two pipes 110 may overlap at least a set distance to prevent the pipes from kinking or binding due to a translational force applied to the pipes. For example, the first and second pipes 120, 140 may overlap to protect the interface between the first and second pipes 120, 140. Specifically, the two pipes may overlap by about greater than or equal to 1 inch, greater than or equal to 1.1 inches, greater than or equal to 1.2 inches, greater than or equal to 1.3 inches, etc. and/or less than or equal to 2 inches, less than or equal to 1.6 inches, less than or equal to 1.5 inches, less than or equal to 1.4 inches, etc. More specifically, the two pipes may each overlap by about 1.4 inches. In one or more embodiments, the amount of overlap may be described by a ratio of length of overlap over the diameter of the pipe. For example, the ratio of length of overlap over the diameter of the pipe may be about greater than or equal to 0.5, greater than or equal to 0.6, greater than or equal to 0.7, etc. and/or less than or equal to 1.5, less than or equal to 1, less than or equal to 0.8, etc.

The first and second pipes 120, 140 may move relative to one another such that the second end 144 of the second pipe 140 may move within the passageway 125 of the first pipe 120 between the first and second ends 122, 124 of the first pipe 120. Accordingly, the first and second pipes 120, 140 may move relative to one another such that the first end 142 of the second pipe 140 may move away from and towards the first end 122 of the first pipe 120 (e.g., in a telescoping fashion). By moving the second pipe 140 relative to the first pipe 120 within the passageway 125 of the first pipe 120, the at least two pipes 110 (e.g., the first and second pipes 120, 140) may define an overall length that may be longer or shorter depending on the relative positioning of the first and second pipes 120, 140. For example, when the second pipe 140 is significantly received (e.g., more than halfway) within the passageway 125 of the first pipe 120 (e.g., in a collapsed configuration), the at least two pipes 110 may be described as shorter than when the second pipe 140 is only minimally received (e.g., less than halfway) within the passageway 125 of the first pipe 120 (e.g., in an extended configuration).

The at least two pipes 110 may include a collar or flange that may be configured to limit the range of motion of each pipe of the at least two pipes 110. For example, each of the first, second, and third pipes 120, 140, 160 may include or be associated with (e.g., fixed upon, adhered to, welded to, press fit to, soldered to, fit with threads, brazed to, etc.) various collars or flanges that are configured to limit the range of motion of each of the first, second, and third pipes 120, 140, 160 relative to one another. In other words, the collars may prevent the pipes from becoming disconnected from one another such that, e.g., the fluid connection is prevented from being broken. Additionally, the collars may be used to, e.g., attach to additional components, align a pipe, provide an interface to the passageway of a pipe, etc.

Figure 7:
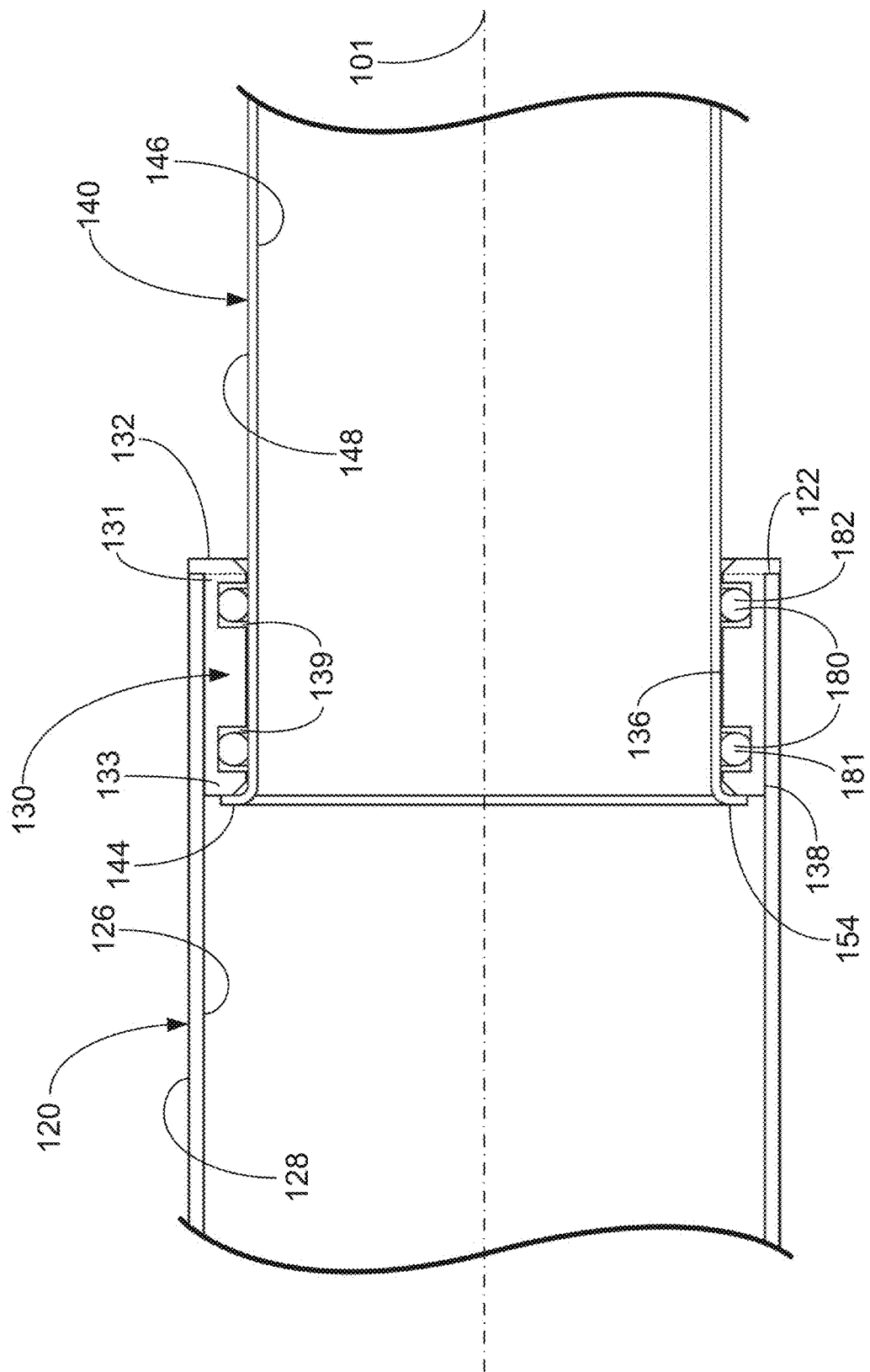
FIG. 7 is an expanded cross-sectional side view of a portion of the exemplary adjustable pipe of FIG. 6.

For example, as shown in FIG. 7 (which is an expanded view of a portion of the adjustable pipe 100 illustrated in FIG. 6), the adjustable pipe 100 may include a first inner collar 132 extending towards the pipe axis 101 and proximate the first end 122 of the first pipe 120. The first inner collar 132 may be defined by the first pipe 120, may be defined by a seal structure 130, or may be a separate component that is coupled to (e.g., using adhesive, weld, etc.) one or both of the first pipe 120 and the seal structure 130 (e.g., the boundary of first inner collar 132 illustrated in FIG. 7 is depicted using a dash-dash line, indicating that the first inner collar 132 may be a part of the first pipe 120, a part of the seal structure 130, or separate from each). For example, the first inner collar 132 may be described as a portion of the first pipe 120 that protrudes towards the pipe axis 101 and thereby deforms the inner surface 126 profile of the first pipe 120.

Also, the adjustable pipe 100 may include a second outer collar 154 extending away from the pipe axis 101 and proximate the second end 144 of the second pipe 140. The second outer collar 154 may be defined by the second pipe 140, may be defined by a seal structure 130, or may be a separate component that is coupled to (e.g., using adhesive, weld, etc.) one or both of the second pipe 140 and the seal structure 130. The second outer collar 154 of the second pipe 140 (or associated with the second pipe 140) may be described as a portion of the second pipe 140 that protrudes away from the pipe axis 101 and thereby deforms the outer surface 148 profile of the second pipe 140. As described herein, each of the first inner collar 132 and the second outer collar 154 may be, e.g., formed from a portion of (or integral with) the corresponding pipe (e.g., the first and second pipes 120, 140, respectively), attached to a portion of the corresponding pipe (e.g., the first and second pipes 120, 140, respectively), formed from a portion of (or integral with) the seal structure 130, or attached to a portion of the seal structure 130.

The collars located on the at least two pipes 110 may restrict some movement of each of the at least two pipes 110 relative to one another. For example, the first inner collar 132 may come in contact with the second outer collar 154 proximate the second end 144 of the second pipe 140, either directly or indirectly, when the first and second pipes 120, 140 move relative to one another, and thereby, the second pipe 140 may be restricted from completely passing through the first pipe 120 (e.g., when traveling from the second end 124 of the first pipe 120 towards the first end 122 of the first pipe 120).

Further, the first pipe 120 may include a second end inner collar 134 as shown in FIGS. 5 and 6. The second end inner collar 134 of the first pipe 120 may extend towards the pipe axis 101 and may be proximate the second end 124 of the first pipe 120. For example, as shown in FIGS. 5 and 6, the second end inner collar 134 may be attached to the second end 124 of the first pipe 120 using threads. The second end inner collar 134 may restrict movement of the second pipe 140 such that the second pipe 140 may not pass through the second end 124 of the first pipe 120 (e.g., because the second pipe 140 would be restricted by the second end inner collar 134 of the first pipe 120 when in the passageway 125 of the first pipe 120).

The adjustable pipe 100 may also include a seal structure 130 that may be configured and positioned to seal the interface between the first and second pipes 120, 140 as shown in FIGS. 6 and 7. For example, the seal structure 130 may be positioned in or around the first pipe 120 or the second pipe 140. Specifically, the seal structure 130 may be positioned or provided between the inner surface 126 of the first pipe 120 and the outer surface 148 of the second pipe 140. Furthermore, the seal structure 130 may be positioned or provided between the first end 122 of the first pipe 120 (e.g., proximate the first inner collar 132) and the second outer collar 154 associated with or proximate the second end 144 of the second pipe 140. In other words, the seal structure 130 may be positioned in at least a portion of the passageway 125 of the first pipe 120 where the first pipe 120 and the second pipe 140 overlap (e.g., in a cavity formed between the first pipe 120 and the second pipe 140). In one or more embodiments, the seal structure 130 may define the overlap distance between the first and second pipes 120, 140 when in the completely extended configuration (e.g., because the seal structure 130 is between the first inner collar 132 and the second outer collar 154 proximate the second end 144 of the second pipe 140).

The seal structure 130 may include any suitable type of sealing element that may be configured to provide a seal between the first and second pipes 120, 140. For example, the seal structure 130 may include sealing elements (e.g., O-rings, gaskets, X-rings, U-cup seals, etc.). Specifically, as shown in FIGS. 6 and 7, the seal structure 130 includes one or more sealing elements 180 (e.g., O-rings) configured to provide a seal between the first and second pipes 120, 140.

The seal structure 130 may define an inner surface 136 and an outer surface 138 opposite the inner surface 136 as shown in FIG. 7. The inner surface 136 of the seal structure 130 may be positioned to face the outer surface 148 of the second pipe 140 and the outer surface of the 138 of the seal structure 130 may be positioned to face the inner surface 126 of the first pipe 120. The seal structure 130 may be fixed to the first or second pipes 120, 140 or freely move between the first and second pipes 120, 140 (and, e.g., between the first inner collar 132 and the second outer collar 154 associated with the second end 144 of the second pipe 140). For example, as shown in FIGS. 5-7, the seal structure 130 may be fixed to the first pipe 120 proximate the first end 122 of the first pipe 120. In other words, the seal structure 130 may move along with the first pipe 120 when the first pipe 120 moves relative to the second pipe 140. In other embodiments, the seal structure 130 may be fixed to the second pipe 140 proximate the second end 144 of the second pipe 140. In other words, the seal structure 130 may move along with the second pipe 140 when the second pipe 140 moves relative to the first pipe 120. The seal structure 130 may be fixed to the first or second pipes 120, 140 in a variety of different ways. For example, the seal structure 130 may be fixed to the first or second pipes 120, 140 by weld, adhesive, cold-weld, interference fit, solvent weld, soldering, brazing, etc. In one or more embodiments, the seal structure 130 may be fixed to the first pipe 120 or the second pipe 140 to prevent any undesired movement of the seal structure 130 when the first pipe 120 and the second pipe 140 move relative to one another.

The one or more sealing elements 180 may be positioned in a variety of different ways to provide a seal between the first pipe 120 and the second pipe 140. For example, the one or more sealing elements 180 may be positioned adjacent (e.g., in contact with) one or both of the first pipe 120 and the second pipe 140 to provide a seal between the first and second pipes 120, 140. Specifically, the one or more sealing elements 180 may be positioned adjacent the second pipe 140 (e.g., the outer surface 148 of the second pipe 140) to restrict fluid from passing between the one or more sealing elements 180 (e.g., of the seal structure 130) and the second pipe 140. If the one or more sealing elements 180 are positioned adjacent the second pipe 140, the seal structure 130 may be fixed to the first pipe 120 or fluidly sealed with the first pipe 120 in any suitable way. The one or more sealing elements 180 may also be positioned adjacent the first pipe 120 (e.g., the inner surface 126 of the first pipe 120) to restrict fluid from passing between the one or more sealing elements 180 (e.g., of the seal structure 130) and the first pipe 120. If the one or more sealing elements 180 are positioned adjacent the first pipe 120, the seal structure 130 may be fixed to the second pipe 140 or fluidly sealed with the second pipe 140 in any suitable way.

Further, the seal structure 130 may define grooves 139 in which the one or more sealing elements 180 (e.g., O-rings) may be located. For example, as shown in FIG. 7, the inner surface 136 of the seal structure 130 defines two grooves 139. The grooves 139 may extend all the way through the seal structure 130 from the inner surface 136 to the outer surface 138 or partially into the seal structure 130 from the surface (e.g., the inner surface 136 of the seal structure 130 and/or the outer surface 138 of the seal structure 130). In some embodiments, the seal structure 130 may define grooves 139 (which contain the one or more sealing elements 180) extending inward from each of the inner and outer surfaces 136, 138 of the seal structure 130, but not completely between the inner and outer surfaces 136, 138 of the seal structure 130.

As shown in FIG. 7, the one or more sealing elements 180 of the seal structure 130 may include two O-rings (e.g., a first O-ring 181 and a second O-ring 182). It is noted that any variety of different sealing elements as described herein may be positioned, described similar to, or used in place of the first and second O-rings 181, 182. In other embodiments, the one or more sealing elements 180 may include any number of O-rings 180, e.g., one O-ring, three O-rings, four O-rings, etc. Each of the one or more sealing elements 180 (e.g., O-rings) may be positioned in a different groove 139 defined in the seal structure 130. For example, as shown in FIG. 7, each of the first and second O-rings 181, 182 of the seal structure 130 may be positioned in a different groove of the two grooves 139 such that each of the first and second O-rings 181, 182 may contact the outer surface 148 of the second pipe 140.

The two O-rings of the one or more sealing elements 180 may be positioned relative to one another in the seal structure 130 in a variety of different ways. For example, the first and second O-rings 181, 182 may remain fixed relative to the seal structure 130 or may move relative to one another in the seal structure 130. However, it may not be desirable to separate the two O-rings of the one or more sealing elements 180 by coupling one sealing element to the first pipe 120 and the other sealing element to the second pipe 140 because, e.g., when the first and second pipes 120, 140 move relative to one another, air pockets could form between those two O-rings.

In one or more embodiments, the first and second O-rings 181, 182 may be adjacent one another or in contact with one another. In other embodiments, the first and second O-rings 181, 182 may be spaced a fixed distance apart in the seal structure 130. As shown in FIG. 7, the first and second O-rings 181, 182 may be separated by a portion of the seal structure 130 (e.g., in two separate grooves 139). In other embodiments, there may be no barrier present between the first and second O-rings 181, 182 in the seal structure 130. In one or more embodiments in which the first and second O-rings 181, 182 may be a fixed distance apart, the distance between the first and second O-rings 181, 182 may be, e.g., greater than or equal to 5 mm, greater than or equal to 8 mm, greater than or equal to 10 mm, greater than or equal to 12 mm, etc. and/or less than or equal to 25 mm, less than or equal to 20 mm, less than or equal to 15 mm, less than or equal to 13 mm, etc.

In one or more embodiments, the seal structure 130 may be configured to abut the first inner collar 132 and/or the second outer collar 154 associated with the second end 144 of the second pipe 140. For example, the seal structure 130 may be fixed to the first pipe 120 proximate the first end 122 of the first pipe 120 such that the seal structure 130 abuts the first inner collar 132. In some embodiments, the seal structure 130 may be fixed to the first end 122 of the first pipe 120 and may define the first inner collar 132. For example, the first inner collar 132 may be larger in diameter than the passageway 125 of the first pipe 120 such that the first inner collar 132 may be restricted from moving within the passageway 125 of the first pipe 120. In other words, the seal structure 130 may extend between a first end 131 and a second end 133, and the first inner collar 132 may be defined at the first end 131 of the seal structure 130 such that the first inner collar 132 contacts the first end 122 of the first pipe 120. In some embodiments, the first inner collar 132 may be described as a protrusion of the outer surface 138 of the seal structure 130 (e.g., an outer flange of the first end 131 of the seal structure 130) that prevents the entirety of the seal structure 130 from passing into the passageway 125 of the first pipe 120.

In one or more embodiments, the seal structure may be fixed to the second pipe 140 proximate the second end 144 of the second pipe 140 such that the seal structure 130 abuts the second outer collar 154 associated with the second end 144 of the second pipe 140. In some embodiments, the seal structure 130 may be fixed to the second end 144 of the second pipe 140 and may define the second outer collar 154 of the second pipe 140.

Additionally, the seal structure 130 may also be configured to abut the first inner collar 132 and/or the second outer collar 154 of the second pipe 140 when the first pipe 120 moves relative to the second pipe 140. In other words, the seal structure 130 may contact the first inner collar 132 (e.g., when the first inner collar 132 is not defined by the seal structure 130) and/or the second outer collar 154 of the second pipe 140 to stop movement of the first or second pipe 120, 140 relative to the other. For example, the second outer collar 154 proximate the second end 144 of the second pipe 140 may be configured to move within the first pipe 120 (e.g., within the passageway 125 of the first pipe 120) with the second outer collar 154 being stopped by contact with the second end inner collar 134 of the first pipe 120 (e.g., in a collapsed configuration) and/or being stopped by contact with the seal structure 130 (e.g., in an extended configuration).

The adjustable pipe 100 may also include a base coupling 194 connected to one of the first and second ends 112, 114 of the at least two pipes 110. The base coupling 194 may be configured for use in coupling the adjustable pipe 100 to the second object 104. For example, as shown in FIGS. 5 and 6, the base coupling 194 may be connected to the second end 124 of the first pipe 120. The base coupling 194 may include anything suitable to couple the adjustable pipe 100 to the second object 104. For example, the base coupling 194 may include fasteners, threads, solvent welds, flanges, compression sleeves, etc. that may be used to couple the adjustable pipe 100 to the second object 104. In some embodiments, the base coupling 194 may be fixed to the second end 124 of the first pipe 120 such that the base coupling 194 may define the second end inner collar 134 of the first pipe 120. The base coupling may be fixed to the first pipe, e.g., by threads, adhesive, weld, cold-weld, glue, etc. The other of the first and second ends 112, 114 of the at least two pipes 110 (e.g., the end not including the base coupling 194) may be configured for use in coupling the adjustable pipe 100 to the first object 102.

As described herein, the at least two pipes 110 may also include a third pipe 160. The third pipe 160 may extend between a first end 162 and a second end 164 as shown in FIG. 6. The third pipe may define an inner surface 166 and an outer surface 168 opposite the inner surface 166. The inner surface 166 of the third pipe 160 may define a passageway between the first and second ends 162, 164 of the third pipe 160. For example, the third pipe may define openings at each of the first and second ends 162, 164 that are connected by the passageway 165 such that fluids may pass through the passageway 165 and between the first and second ends 162, 164, of the third pipe 160.

As shown in FIGS. 5 and 6, at least a portion of the third pipe 160 may be configured to be received by at least a portion of the second pipe 140 (e.g., within the passageway 145 of the second pipe 140). For example, the first end 142 of the second pipe 140 may partially overlap the second end 164 of the third pipe 160. In other words, the inside diameter (e.g., the inner surface 146) of the second pipe 140 (e.g., proximate the first end 142) may be greater than or equal to the outside diameter (e.g., the outer surface 168) of the third pipe 160 (e.g., proximate the second end 164) to allow the third pipe 160 to be received by the second pipe 140. The inside diameter of the second pipe 140 may be about, e.g., greater than or equal to 1 inch, greater than or equal to 1.25 inches, greater than or equal to 1.5 inches, greater than or equal to 2 inches, etc. and/or less than or equal to 4.5 inches, less than or equal to 4 inches, less than or equal to 3 inches, less than or equal to 2.5 inches, etc., and the outside diameter of the third pipe 160 may be about, e.g., greater than or equal to 1 inch, greater than or equal to 1.25 inches, greater than or equal to 1.5 inches, greater than or equal to 2 inches, etc. and/or less than or equal to 4.5 inches, less than or equal to 4 inches, less than or equal to 3 inches, less than or equal to 2.5 inches, etc.

The second and third pipes 140, 160 may move relative to one another such that the second end 164 of the third pipe 160 may move within the passageway 145 of the second pipe 140 between the first and second ends 142, 144 of the second pipe 140. Accordingly, the second and third pipes 140, 160 may move relative to one another such that the first end 162 of the third pipe 160 may move away from and towards the first end 142 of the second pipe 140.

Moving the first pipe 120, the second pipe 140, and third pipe 160 relative to one another such that each of the first, second, and third pipes 120, 140, 160 are "pulled away" from each other (e.g., the first pipe 120 pulled relative to the second pipe 140 such that the first end 122 of the first pipe 120 may be moved proximate the second end 144 of the second pipe 140 and the second pipe 140 pulled relative to the third pipe 160 such that the first end 142 of the second pipe 140 may be moved proximate the second end 164 of the third pipe 160) may position the adjustable pipe 100 in the extended configuration (e.g., as shown in FIGS. 4 and 6). On the other hand, moving the first, second, and third pipes 120, 140 160 relative to one another such that each pipe significantly overlaps at least one other pipe (e.g., the first pipe 120 collapsed on top of the second pipe 140 such that the first and second ends 122, 124 of the first pipe 120 are moved proximate to the first and second ends 142, 144 of the second pipe 140, respectively, and the second pipe 140 collapsed over the third pipe 160 such that the first and second ends 142, 144 of the second pipe 140 are moved proximate to the first and second ends 162, 164 of the third pipe 160, respectively) may position the adjustable pipe 100 in the collapsed configuration (e.g., as shown in FIGS. 3 and 5).

Figure 8:
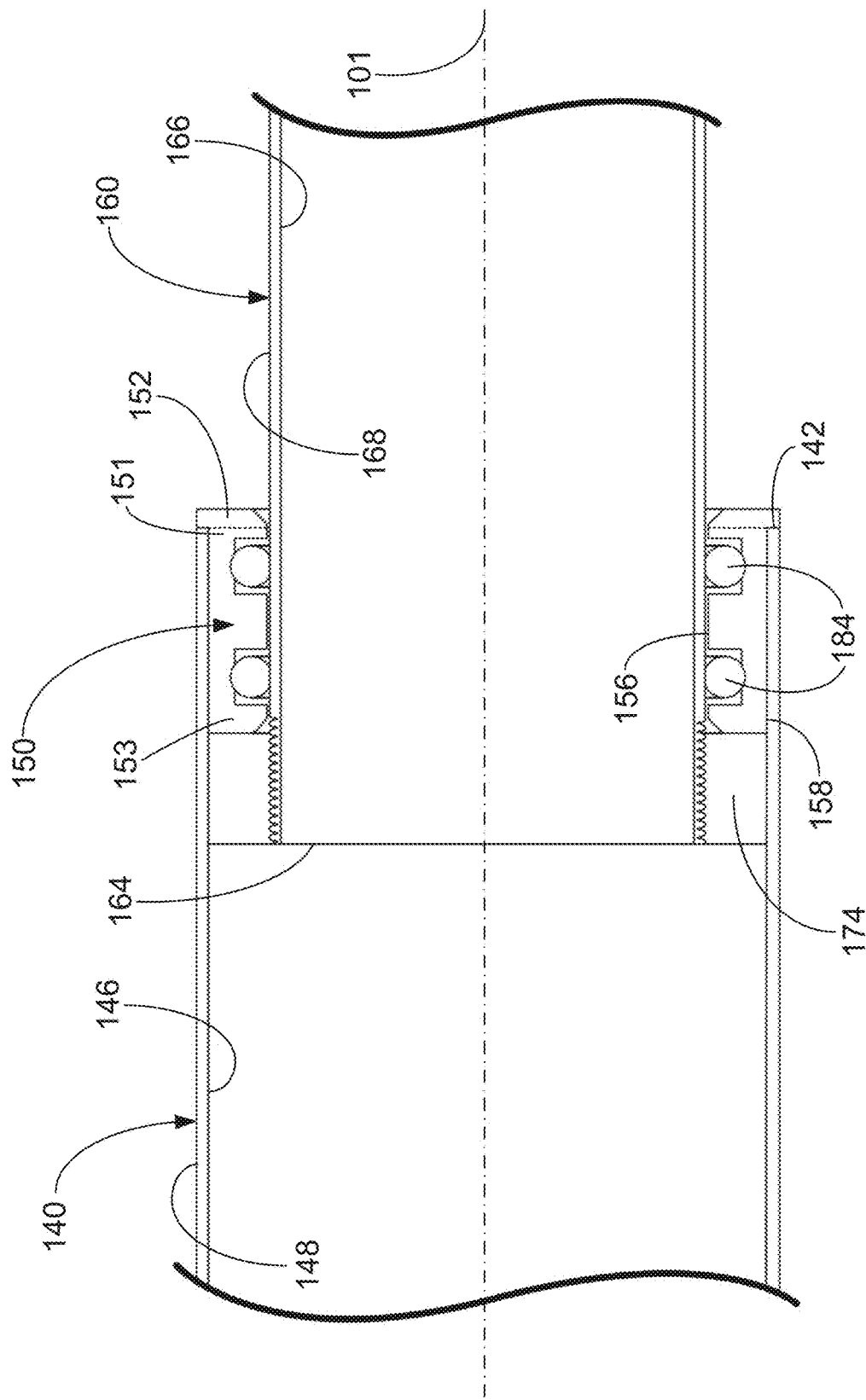
FIG. 8 is an expanded cross-sectional side view of another portion of the exemplary adjustable pipe of FIG. 6.

Further, as shown in FIG. 8, the third pipe 160 may include a third outer collar 174 extending away from the pipe axis 101 and proximate the second end 164 of the third pipe 160. The third outer collar 174 of the third pipe 160 may be described as a portion of the third pipe that protrudes away from the pipe axis 101 and thereby deforms the outer surface 168 profile of the third pipe 160. Additionally, as shown in FIG. 8, the adjustable pipe 100 may include a second inner collar 152 extending towards the pipe axis 101 and proximate the first end 142 of the second pipe 140. The second inner collar 152 may be defined by the second pipe 140, may be defined by an additional seal structure 150, or may be a separate component that may be coupled to (e.g., using adhesive, weld, etc.) one or both of the second pipe 140 and the additional seal structure 150 (e.g., the boundary of the second inner collar 152 illustrated in FIG. 8 is depicted using a dash-dash line, indicating that the second inner collar 152 may be a part of the second pipe 140, a part of the additional seal structure 150, or separate from each). For example, the second inner collar 152 may be described as a portion of the second pipe 140 that protrudes towards the pipe axis 101 and thereby deforms the inner surface 146 profile of the second pipe 140.

As described herein, each of the third outer collar 174 proximate or associated with the second end 164 of the third pipe 160 and the second inner collar 152 may be, e.g., formed from a portion of (or integral with) the corresponding pipe (e.g., the third and second pipes 160, 140, respectively), attached to a portion of the corresponding pipe (e.g., the third and second pipes 160, 140, respectively), formed from a portion of (or integral with) the additional seal structure 150, or attached to a portion of the additional seal structure 150. For example, the third outer collar 174 proximate the second end 164 of the third pipe 160 may include a threaded portion that may be attached or screwed onto a threaded second end 164 of the third pipe 160.

Figure 9:
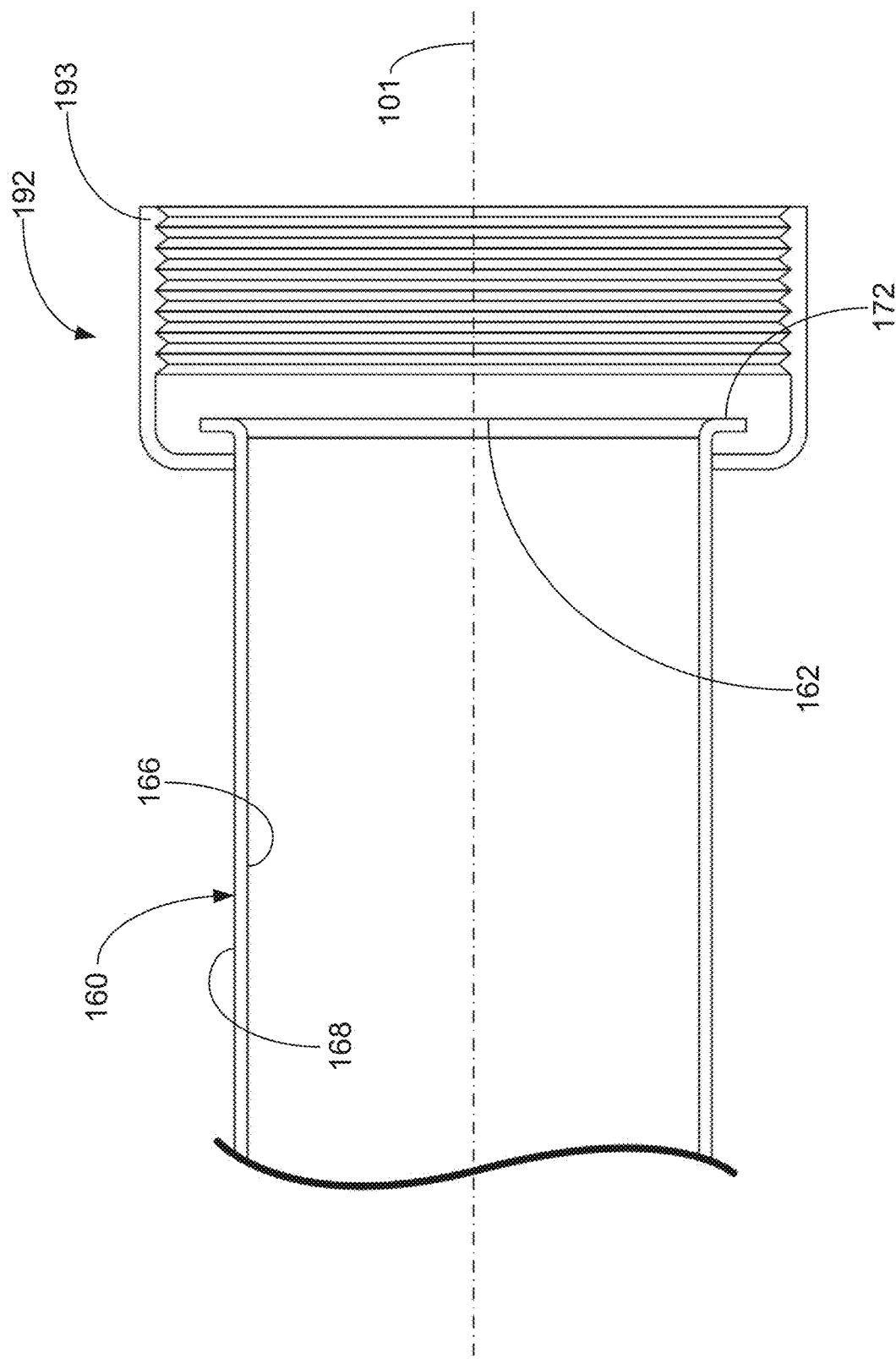
FIG. 9 is an expanded cross-sectional side view of yet another portion of the exemplary adjustable pipe of FIG. 6 and including a first object coupling.

The third pipe 160, as shown in FIG. 9, may also include a first outer collar 172 extending away from the pipe axis 101 and proximate the first end 162 of the third pipe 160. The first outer collar 172 proximate or associated with the first end 162 of the third pipe 160 may be described as a portion of the third pipe 160 that protrudes away from the pipe axis 101 and thereby deforms the outer surface 168 profile of the third pipe 160. The first outer collar 172 may be defined by the third pipe 160 or may be a separate component that may be coupled to (e.g., using adhesive, weld, press fit, etc.) the third pipe 160 (e.g., proximate the first end 162 of the third pipe 160). The first outer collar 172 may also be described as proximate the first end 112 of the at least two pipes 110, and therefore, may interface with any components (e.g., the first object 102) that interact with the adjustable pipe 100 at the first end 112 of the at least two pipes 110.

The adjustable pipe 100 may also include an additional seal structure 150 that may be configured and positioned to seal the interface between the second and third pipes 140, 160 as shown in FIGS. 6 and 8. The additional seal structure 150 may be positioned or provided between the inner surface 146 of the second pipe 140 and the outer surface 168 of the third pipe 160. Furthermore, the additional seal structure 150 may be positioned or provided between the second inner collar 152 and the third outer collar 174 proximate or associated with the second end 164 of the third pipe 160. In other words, the additional seal structure 150 may be positioned in at least a portion of the passageway 145 of the second pipe 140 where the second pipe 140 and the third pipe 160 overlap (e.g., in a cavity formed between the second pipe 140 and the third pipe 160).

The additional seal structure 150 may be described similar to and include many of the same features of the seal structure 130, as described herein. For example, the additional seal structure 150 may include one or more sealing elements 184 configured to provide a seal between the second and third pipes 140, 160. The additional seal structure 150 may be fixed to the second pipe 140 or the third pipe 160 or freely move between the second and third pipes 140, 160 (e.g., between the second inner collar 152 and the third outer collar 174 proximate the second end 164 of the third pipe 160). For example, as shown in FIG. 8, the additional seal structure 150 may be fixed to the second pipe 140 proximate the first end 142 of the second pipe 140. Further, in one or more embodiments, the additional seal structure 150 may be fixed to the second pipe 140 proximate the first end 142 of the second pipe 140 such that the additional seal structure 150 may abut the second inner collar 152. In other embodiments, the additional seal structure 150 may be fixed to the first end 142 of the second pipe 140 and may define the second inner collar 152. For example, the second inner collar 152 may be larger in diameter than the passageway 145 of the second pipe 140 such that the second inner collar 152 may be restricted from moving within the passageway 145 of the second pipe 140. In other words, the additional seal structure 150 may extend between a first end 151 and a second end 153, and the second inner collar 152 may be defined at the first end 151 of the additional seal structure 150 such that the second inner collar 152 contacts the first end 142 of the second pipe 140. In some embodiments, the second inner collar 152 may be described as a protrusion of the outer surface 158 of the additional seal structure 150 (e.g., an outer flange of the first end 151 of the additional seal structure 150) that prevents the entirety of the additional seal structure 150 from passing into the passageway 145 of the second pipe 140.

It is noted that the additional seal structure 150 may be narrower between the first and second ends 151, 153 of the additional seal structure 150 than the seal structure 130 (and, therefore, the one or more sealing elements 184 closer together) because the third pipe 140 may include a threaded third outer collar 174 associated with the second end 164 of the third pipe 160. The additional seal structure 150 and the third outer collar 174 proximate the second end 164 of the third pipe 160 together may define the amount of overlap of the second pipe 140 and the third pipe 160 when in the extended configuration. On the other hand, only the seal structure 130 may define the amount of overlap of the first pipe 120 and the second pipe 140 when in the extended configuration, and therefore, seal structure 130 may be longer (e.g., between the first and second ends 131, 133) than the additional seal structure 150. In one or more embodiments, the additional seal structure 150 may be the same length as the seal structure 130 because, e.g., the third outer collar 174 of the third pipe 160 may be formed from the third pipe 160 similar to how the second outer collar 154 of the second pipe 140 may be formed from the second pipe 140 (e.g., as shown in FIG. 7).

The collars located on the second and third pipes 140, 160 may restrict some movement between each of the second and third pipes 140, 160 relative to one another. For example, the first outer collar 172 proximate the first end 162 of the third pipe 160 and the third outer collar 174 proximate the second end 164 of the third pipe 160 may prevent the third pipe 160 from being completely removed from the passageway 145 of the second pipe 140. Furthermore, the third outer collar 174 of the third pipe 160 may be configured to move within the second pipe 140 with the third outer collar 174 of the third pipe 160 being stopped by contact with the additional seal structure 150 (or, e.g., the second inner collar 152) and/or the first outer collar 172 of the third pipe 160 being stopped by contact with the second inner collar 152. In such embodiments where the third outer collar 174 of the third pipe 160 may be removably attached to the second end 164 of the third pipe 160, the third pipe 160 may be completely removed from within the passageway 145 of the second pipe 140 (e.g., through the first end 142 of the second pipe 140) when the third outer collar 174 associated with the third pipe 160 is not attached.

As described herein, one of the first and second ends 112, 114 of the at least two pipes 110 (e.g., the end not including the base coupling 194) may be configured for use in coupling the adjustable pipe 110 to the first object 102. For example, the adjustable pipe 100 may include a first object coupling 192 (e.g., illustrated in FIG. 9) configured for use in coupling the adjustable pipe 100 to the first object 102. The first object coupling 192 may be connected to one of the first and second ends 112, 114 of the at least two pipes 110 (e.g., the end not including the base coupling 194). Specifically, for example, the first object coupling 192 may be connected to the first end 162 of the third pipe 160 as shown in FIG. 9. The first object coupling 192 may be any suitable component configured to couple the adjustable pipe 100 and the first object 102. For example, the first object coupling 192 may include a slip nut, plumbing thread, flange and gasket (e.g., with wax or rubber seal), solvent welded plastic coupling, etc. Specifically, the first object coupling 192 may be described as a slip nut 193, as shown in FIG. 9.

The first object coupling 192 may move relative to and over the outer surface 168 of the third pipe 160. For example, the first object coupling 192 may be configured to slide between the first and second ends 162, 164 of the third pipe 160. The first object coupling 192 may define an aperture through which the first object coupling 192 may slide over the third pipe 160. In other words, the aperture of the first object coupling 192 may define a diameter that is greater than or equal to the diameter of the third pipe 160 (e.g., the outer surface 168 of the third pipe 160). The first object coupling 192 may be restricted from disconnecting from the third pipe 160 by the first outer collar 172 of the third pipe 160 (e.g., because the first object coupling 192 may be stopped by contact with the first outer collar 172 associated with or proximate the first end 162 of the third pipe 160). Also, the first object coupling 192 may be restricted from disconnecting from the second end 164 of the third pipe 160 by the presence of the second pipe 140 when the third pipe 160 is received by the second pipe 140. Furthermore, in one or more embodiments, because the first object coupling 192 may be free to rotate around the at least two pipes 110 (e.g., the third pipe 160), the adjustable pipe 100 may be able to rotate relative to the first object 102 as necessary (e.g., to attach or screw the first object coupling 192 to the first object 102). In other embodiments, the first object coupling 192 may be fixed to or integrated with the at least two pipes 110 (e.g., the third pipe 160) such that the adjustable pipe 100 may not rotate relative to the first object 102.

Figure 10:
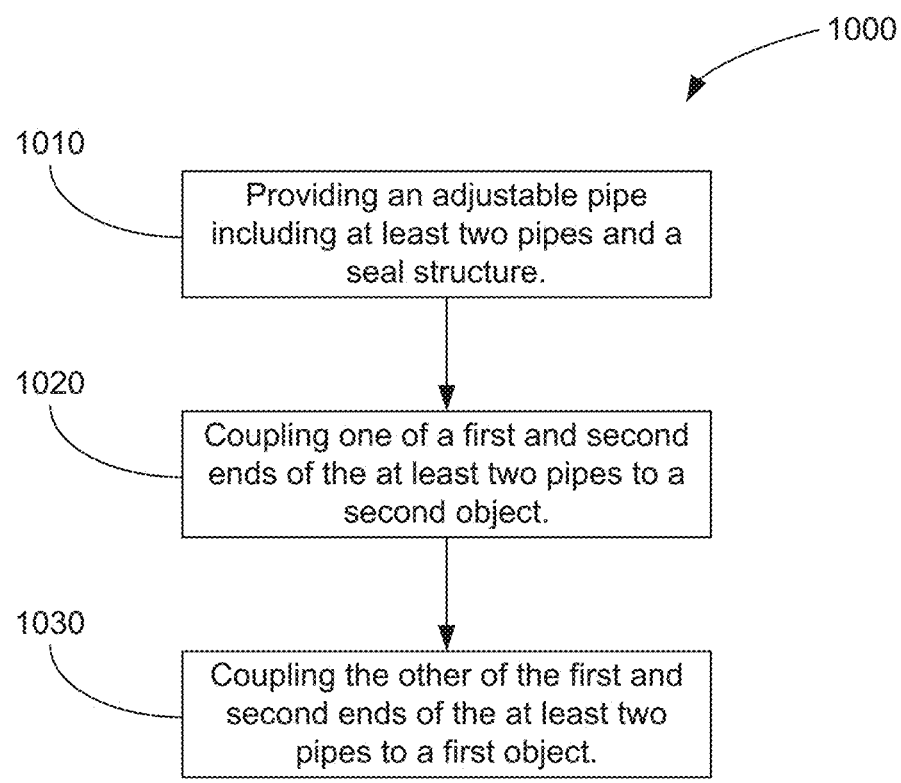
FIG. 10 is a block diagram of an exemplary method of installing the adjustable pipe of FIGS. 1-9 between a first object and a second object.

One exemplary method 1000 of installing an adjustable pipe (e.g., the adjustable pipe 100) between a first object (e.g., the first object 102) and a second object (e.g., the second object 104) is illustrated in FIG. 10. The method 1000 may include providing 1010 the adjustable pipe and the adjustable pipe may include at least two pipes (e.g., the at least two pipes 110) extending along a pipe axis (e.g., the pipe axis 101) between a first end (e.g., the first end 112 of the at least two pipes 110) and a second end (e.g., the second end 114 of the at least two pipes 110).

The at least two pipes may include a first pipe (e.g., the first pipe 120) extending between a first end (e.g., the first end 122 of the first pipe 120) and a second end (e.g., the second end 124 of the first pipe 120). The first pipe may define an inner surface (e.g., the inner surface 126 of the first pipe 120) and an outer surface (e.g., the outer surface 128 of the first pipe 120) opposite the inner surface. The inner surface of the first pipe may define a passageway (e.g., the passageway 125 of the first pipe 120) between the first and second ends of the first pipe. The adjustable pipe may further include a first inner collar (e.g., the first inner collar 132 of the first pipe 120) extending towards the pipe axis and proximate the first end of the first pipe.

The at least two pipes may also include a second pipe (e.g., the second pipe 140) extending between a first end (e.g., the first end 142 of the second pipe 140) and a second end (e.g., the second end 144 of the second pipe 140). The second pipe may define an inner surface (e.g., the inner surface 146 of the second pipe 140) and an outer surface (e.g., the outer surface 148 of the second pipe 140) opposite the inner surface. The inner surface of the second pipe may define a passageway (e.g., the passageway 145 of the second pipe 140) between the first and second ends of the second pipe. The adjustable pipe may further include a second outer collar (e.g., the second outer collar 154 proximate the second end 144 of the second pipe 140) extending away from the pipe axis and proximate the second end of the second pipe. At least a portion of the second pipe may be configured to be received by at least a portion of the passageway of the first pipe.

The adjustable pipe may further include a seal structure (e.g., the seal structure 130) positioned between the inner surface of the first pipe and the outer surface of the second pipe and between the first inner collar of the first pipe and the second outer collar of the second pipe. The seal structure may include one or more sealing elements (e.g., the one or more sealing elements 180 of the seal structure 130) configured to provide a seal between the first and second pipes.

The method 1000 may further include coupling 1020 one of the first and second ends of the at least two pipes to the second object and coupling 1030 the other of the first and second ends of the at least two pipes to the first object. In one or more embodiments, the coupling 1020 of one of the first and second ends of the at least two pipes to the second object may include coupling a pipe thread connected to the second end of the at least two pipes to the second object (e.g., an exit pipe, an outlet pipe, an additional pipe, a trap pipe, P-trap, building plumbing, etc.). In one or more embodiments, the coupling 1030 of the other of the first and second ends of the at least two pipes to the first object may include coupling a slip nut 193 associated with the first end of the at least two pipes to the first object (e.g., a sink bowl, a basin, a reservoir, a tub, a toilet, a basket, a sink outlet, etc.).

Figure 11A:
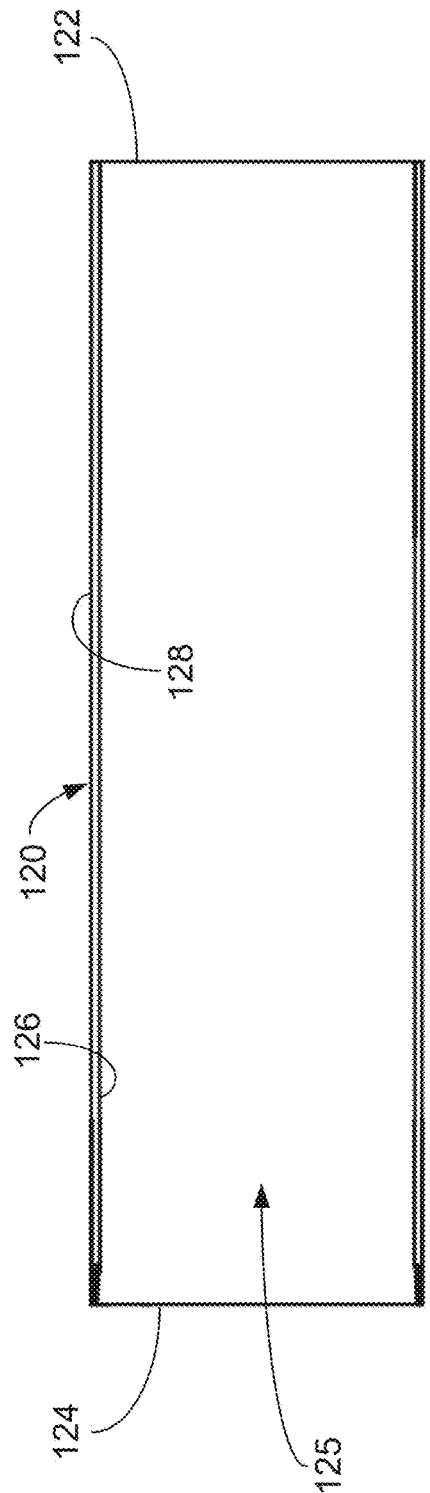

One exemplary method of manufacturing an adjustable pipe extending along a pipe axis for connection between a first object and a second object is illustrated in the cross-sectional views of FIGS. 11A-11G. For example, the method may include providing a first pipe 120 extending between a first end 122 and a second end 124 as shown in FIG. 11A. The first pipe 120 may define an inner surface 126 and an outer surface 128 opposite the inner surface 128. The inner surface 126 of the first pipe 120 may define a passageway 125 between the first and second ends 122, 124 of the first pipe 120.

Figure 11B:
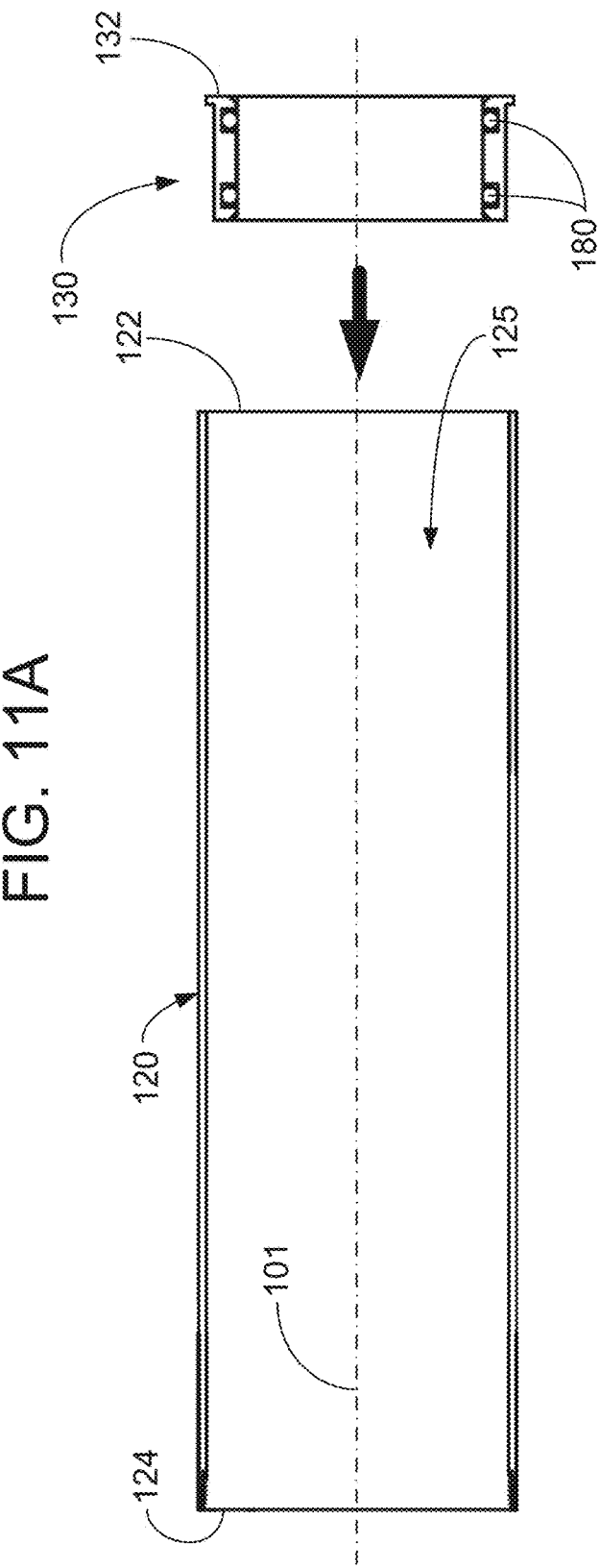

The method of manufacturing an adjustable pipe may further include inserting a seal structure 130 into the passageway 125 of the first pipe 120. For example, the seal structure 130 may be inserted into the first pipe 120 through the first end 122 of the first pipe 120 as shown in FIG. 11B. In other embodiments, the seal structure 130 may be inserted into the passageway 125 of the first pipe 120 through the second end 124 of the first pipe 120. The seal structure 130 may be positioned proximate the first end 122 of the second pipe 120. In one or more embodiments, the method of manufacturing the adjustable pipe may include fixing the seal structure 130 to the first pipe 120 (e.g., proximate the first end 122 of the first pipe 120). For example, the seal structure 130 may be fixed to the first pipe 120 by threads, adhesive, weld, interference fit, etc.

The seal structure 130 may include one or more sealing elements 180 as described further herein. In one or more embodiments, a first inner collar 132 may extend towards the pipe axis 101 and may be proximate the first end 122 of the first pipe 120. In some embodiments, the first pipe 120 may define the first inner collar 132. In other embodiments, the seal structure 130 may define the first inner collar 132. In such embodiments that the first inner collar 132 may be integral with the seal structure 130, the first inner collar 132 may fix the seal structure 130 at the first end 122 of the first pipe 120 because the first inner collar 132 abuts the first end 122 of the first pipe 120 such that the entirety of the seal structure 130 does not pass through the passageway 125 of the first pipe 120.

The method of manufacturing the adjustable pipe may further include providing a second pipe 140 that may extend between a first end 142 and a second end 144 as shown in FIG. 11C. The second pipe 140 may define an inner surface 146 and an outer surface 148 opposite the inner surface 146. The inner surface 146 of the second pipe 140 may define a passageway 145 between the first and second ends 142, 144 of the second pipe 140. The second pipe 140 may include a second outer collar 154 extending away from the pipe axis 101 and proximate the second end 144 of the second pipe 140. Additionally, the method of manufacturing the adjustable pipe may include inserting an additional seal structure 150 into the passageway 145 of the second pipe 140. For example, the additional seal structure 150 may be inserted into the second pipe 140 through the first end 142 of the second pipe 140 as shown in FIG. 11C. In other embodiments, the additional seal structure 150 may be inserted into the second pipe 140 through the second end 144 of the second pipe 140.

The method of manufacturing the adjustable pipe may also include inserting the second pipe 140 through the second end 124 of the first pipe 120 and the seal structure 130 as shown in FIG. 11D. The second pipe 140 may be inserted through the first pipe 120 (e.g., through the passageway 125 of the first pipe 120) after inserting the seal structure 130 into the first pipe 120. The second pipe 140 may be inserted through the seal structure 130 such that the seal structure 130 may be positioned or provided between the inner surface 126 of the first pipe 120 and the outer surface 148 of the second pipe 140 and between the first end 122 of the first pipe 120 and the second outer collar 154 proximate the second end 144 of the second pipe 140. The one or more sealing elements 180 of the seal structure 130 may be configured to provide a seal between the first and second pipes 120, 140.

The additional seal structure 150 may be positioned proximate the first end 142 of the second pipe 140. In one or more embodiments, the method of manufacturing the adjustable pipe may include fixing the additional seal structure 150 to the second pipe 140 (e.g., proximate the first end 142 of the second pipe 140). For example, the additional seal structure 150 may be fixed to the second pipe 140 by threads, adhesive, weld, interference fit, etc. In one or more embodiments, the additional seal structure 150 may be inserted into the second pipe 140 after the second pipe 140 is inserted through the first pipe 120. However, as shown in FIG. 11D, the additional seal structure 150 may be inserted into the second pipe 140 before the second pipe 140 is inserted through the first pipe 120. Inserting the additional seal structure 150 into the second pipe 140 before the second pipe 140 is inserted through the first pipe 120 may allow for attaching the additional seal structure 150 to the second pipe 140 using a variety of different manufacturing techniques (e.g., welding, soldering, brazing, molding, etc.) that may otherwise affect components (e.g., sealing elements) after the second pipe 140 is inserted into the first pipe 120.

The additional seal structure 150 may include one or more sealing elements 184 as described herein. In one or more embodiments, a second inner collar 152 may extend towards the pipe axis 101 and may be proximate the first end 142 of the second pipe 140. In some embodiments, the second pipe 140 may define the second inner collar 152. In other embodiments, the additional seal structure 150 may define the second inner collar 152. In such embodiments that the second inner collar 152 may be integral with the additional seal structure 150, the second inner collar 152 may fix the additional seal structure 150 at the first end 142 of the second pipe 140 because the second inner collar 152 abuts the first end 142 of the second pipe 140 such that the entirety of the additional seal structure 150 does not pass through the passageway 145 of the second pipe 140.

Figure 11E:
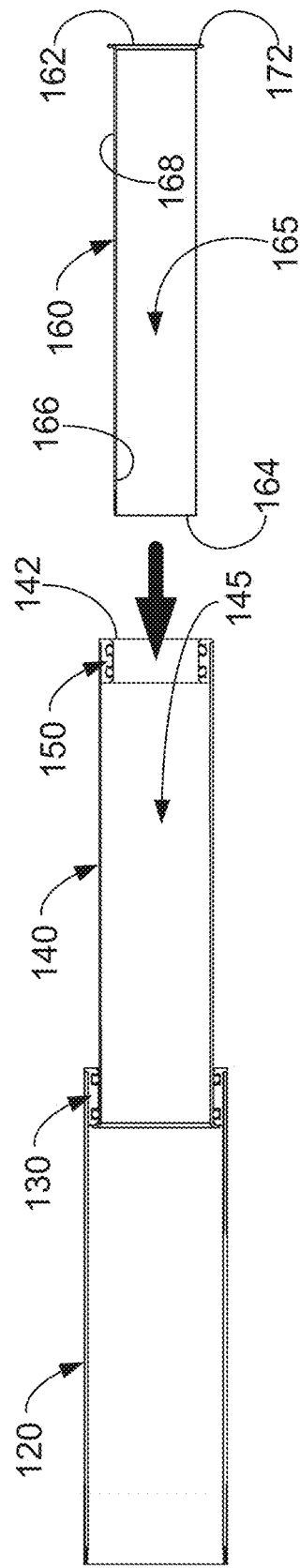

Furthermore, the method of manufacturing the adjustable pipe may include inserting a third pipe 160 through the first end 142 of the second pipe 140 and the additional seal structure 150 as shown in FIG. 11E. In one more embodiments, the third pipe 160 may be inserted into the second pipe 140 (e.g., through the passageway 145 of the second pipe 140) after inserting the additional seal structure 150 into the first end 142 of the second pipe 140. In some embodiments, the third pipe 160 may be inserted into the second pipe 140 before inserting the additional seal structure 150 into the second pipe 140. The third pipe 160 may extend between a first end 162 and a second end 164. The third pipe 160 may define an inner surface 166 and an outer surface 168 opposite the inner surface 166. The inner surface 166 of the third pipe 160 may define a passageway 165 between the first and second ends 162, 164 of the third pipe 160.

Figure 11F:
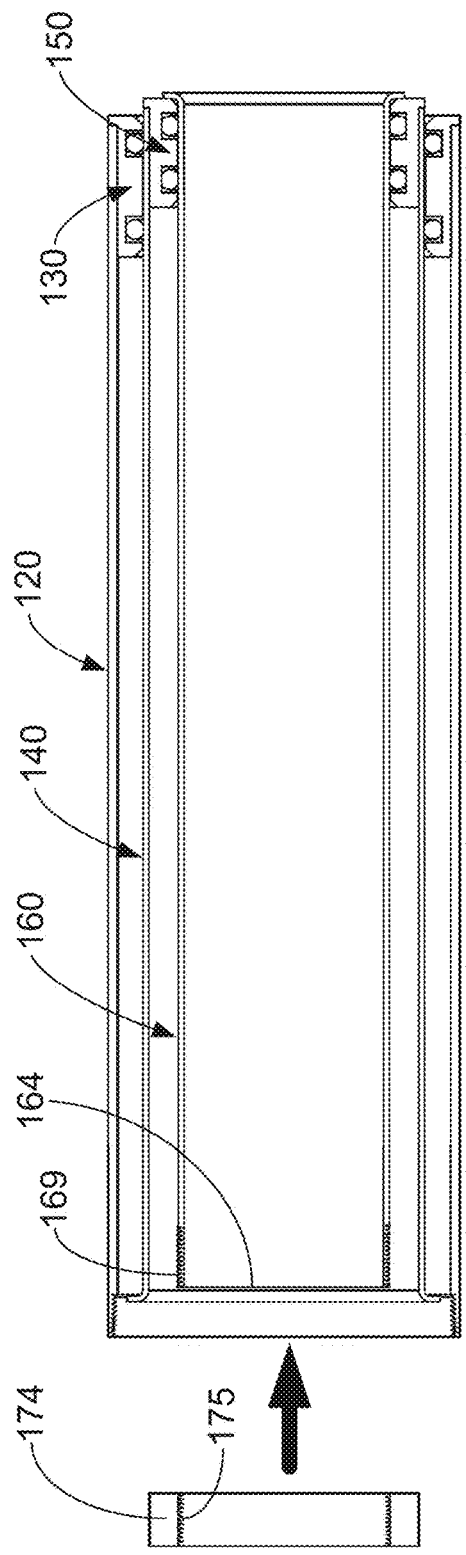

The method of manufacturing the adjustable pipe may further include attaching a third outer collar 174 proximate the second end 164 of the third pipe 160 as shown in FIG. 11F (e.g., illustrating the at least two pipes 110 in the collapsed configuration). For example, the third outer collar 174 associated with the second end 164 of the third pipe 160 may be attached to the third pipe 160 after inserting the third pipe 160 through the first end 142 of the second pipe 140 and the additional seal structure 150. The third outer collar 174 of the third pipe 160 may extend away from the pipe axis 101. The third outer collar 174 may be attached to the third pipe 160 in any suitable way. For example, the third outer collar 174 may be attached to the third pipe 160 by threads, adhesive, weld, cold-weld, glue, etc. In one or more embodiments, the third outer collar 174 may be attached to the third pipe 160 using threads so that the third outer collar 174 may be removed for disassembly of the adjustable pipe 100. For example, as illustrated in FIG. 11F, threads 175 of the third outer collar 174 may interact with threads 169 of the third pipe 160.

The third pipe 160 may be inserted through the additional seal structure 150 such that the additional seal structure 150 may be positioned or provided between the inner surface 146 of the second pipe 140 and the outer surface 168 of the third pipe 160 and between the first end 142 of the second pipe 140 and the third outer collar 174 associated with the second end 164 of the third pipe 160. The one or more sealing elements 184 of the additional seal structure 150 may be configured to provide a seal between the second and third pipes 140, 160.

Figure 11G:
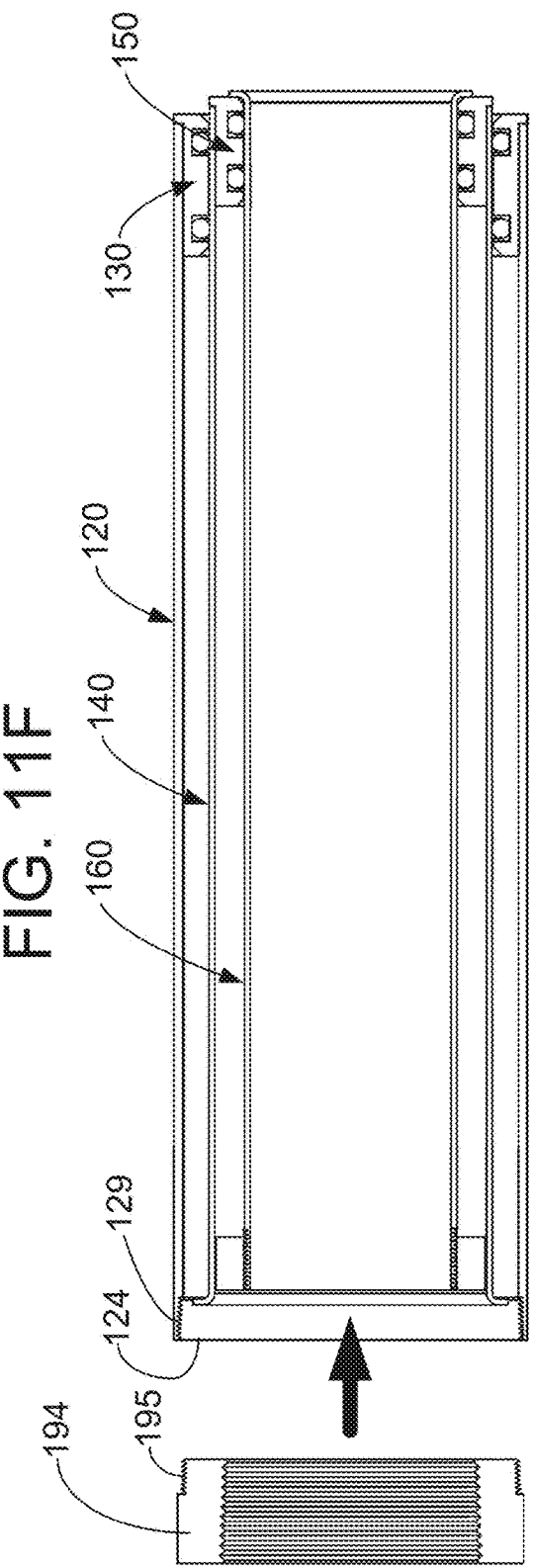

Further, the method of manufacturing the adjustable pipe may include connecting a base coupling 194 to the second end 124 of the first pipe 120 as shown in FIG. 11G (e.g., illustrating the at least two pipes 110 in the collapsed configuration). For example, the base coupling 194 may be attached to the first pipe 120 after attaching the third outer collar 174 proximate the second end 164 of the third pipe 160. The base coupling 194 may be configured for use in coupling the adjustable pipe 100 to the second object 104 (e.g., as shown in FIGS. 1-2). The base coupling 194 may be attached to the first pipe 120 in any suitable way. For example, the base coupling 194 may be attached to the first pipe 120 by threads, adhesive, weld, cold-weld, glue, etc. In one or more embodiments, the base coupling may be attached to the first pipe 120 using threads so that the base coupling 194 may be removed for disassembly of the adjustable pipe 100. For example, as illustrated in FIG. 11G, threads 195 of the base coupling 194 may interact with threads 129 of the first pipe 120.

In one or more embodiments, the method of manufacturing may also include connecting a first object coupling 192, or specifically, a slip nut 193 (e.g., illustrated in FIG. 9) to the first end 162 of the third pipe 160. For example, the slip nut 193 may be slid onto the second end 164 of the third pipe 160 and towards the first end 162 of the third pipe 160 before the third pipe 160 is inserted through the first end 142 of the second pipe 140 and the additional seal structure 150. The slip nut 193 may be configured for use in coupling the adjustable pipe 100 to the first object 102 (e.g., as shown in FIGS. 1-2).

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Particular materials and dimensions thereof recited in the disclosed examples, as well as other conditions and details, should not be construed to unduly limit this disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An adjustable pipe for fluid connection between a first object and a second object, wherein the adjustable pipe comprises: at least two pipes extending along a pipe axis between a first end and a second end, wherein the at least two pipes comprise: a first pipe extending between a first end and a second end, wherein the first pipe defines an inner surface and an outer surface opposite the inner surface, wherein the inner surface of the first pipe defines a passageway between the first and second ends of the first pipe, and a second pipe extending between a first end and a second end, wherein the second pipe defines an inner surface and an outer surface opposite the inner surface, wherein the inner surface of the second pipe defines a passageway between the first and second ends of the second pipe, wherein at least a portion of the second pipe is configured to be received by at least a portion of the passageway of the first pipe; a first inner collar extending towards the pipe axis and radially over an outermost end of the first end of the first pipe, and wherein the first inner collar is in abutment with the outermost end of the first end of the first pipe; a second outer collar extending away from the pipe axis and proximate the second end of the second pipe; a seal structure provided between the inner surface of the first pipe and the outer surface of the second pipe, wherein the seal structure is permanently positioned in abutment with the first inner collar, wherein the seal structure comprises one or more sealing elements configured to provide a seal between the first and second pipes; and a base coupling connected to one of the first and second ends of the at least two pipes, wherein the base coupling is configured for use in coupling the adjustable pipe to the second object, wherein the other of the first and second ends of the at least two pipes is configured for use in coupling the adjustable pipe to the first object.

2. The adjustable pipe of claim 1, wherein the seal structure comprises the first inner collar proximate the first end of the first pipe.

3. The adjustable pipe of claim 1, wherein the first pipe defines the first inner collar at the first end of the first pipe.

4. The adjustable pipe of claim 1, wherein the at least two pipes further comprise a third pipe extending between a first end and a second end, wherein the third pipe defines an inner surface and an outer surface opposite the inner surface, wherein the inner surface of the third pipe defines a passageway between the first and second ends of the third pipe, wherein at least a portion of the third pipe is configured to be received by at least a portion of the passageway of the second pipe,
wherein the adjustable pipe further comprises:
a second inner collar extending towards the pipe axis and proximate the first end of the second pipe;
a third outer collar extending away from the pipe axis and proximate the second end of the third pipe; and
an additional seal structure provided between the inner surface of the second pipe and the outer surface of the third pipe, wherein the additional seal structure is also provided between the first end of the second pipe and the third outer collar proximate the second end of the third pipe, wherein the additional seal structure comprises one or more sealing elements configured to provide a seal between the second and third pipes.

5. The adjustable pipe of claim 4, wherein the additional seal structure comprises the second inner collar proximate the first end of the second pipe.

6. The adjustable pipe of claim 4, wherein the second pipe defines the second inner collar at the first end of the second pipe.

7. The adjustable pipe of claim 4, further comprising a first object coupling configured for use in coupling the adjustable pipe to the first object, wherein the first object coupling is connected to the first end of the third pipe.

8. The adjustable pipe of claim 1, wherein the base coupling is connected to the second end of the first pipe.

9. The adjustable pipe of claim 1, wherein the base coupling defines a second end inner collar of the first pipe, wherein the second end inner collar of the first pipe extends towards the pipe axis and proximate the second end of the first pipe.

10. The adjustable pipe of claim 9, wherein the second outer collar at the second end of the second pipe is configured to move within the first pipe, the second outer collar at the second end of the second pipe being stopped by contact with the second end inner collar of the first pipe.

11. The adjustable pipe of claim 1, wherein the one or more sealing elements of the seal structure comprises a first O-ring and a second O-ring, wherein a distance between the first O-ring of the seal structure and the second O-ring of the seal structure is fixed.

12. The adjustable pipe of claim 11, wherein the seal structure defines an inner surface and an outer surface opposite the inner surface, wherein the inner surface of the seal structure faces the outer surface of the second pipe and the outer surface of the seal structure faces the inner surface of the first pipe, wherein two grooves are defined in the inner surface of the seal structure, wherein each of the first and second O-rings of the seal structure is positioned in a different groove of the two grooves such that each of the first and second O-rings contact the outer surface of the second pipe.

13. The adjustable pipe of claim 1, wherein the at least two pipes are configurable between a collapsed configuration and an extended configuration, wherein the at least two pipes extend a greater length along the pipe axis when in extended configuration than when in the collapsed configuration.

14. The adjustable pipe of claim 1, wherein the seal structure extends between a first end and a second end, and wherein the seal structure defines a tapered inner surface at both the first and second ends of the seal structure.

15. An adjustable pipe for fluid connection between a first object and a second object, wherein the adjustable pipe comprises: at least two pipes extending along a pipe axis between a first end and a second end, wherein the at least two pipes comprise: a first pipe extending between a first end and a second end, wherein the first pipe defines an inner surface and an outer surface opposite the inner surface, wherein the inner surface of the first pipe defines a passageway between the first and second ends of the first pipe, and a second pipe extending between a first end and a second end, wherein the second pipe defines an inner surface and an outer surface opposite the inner surface, wherein the inner surface of the second pipe defines a passageway between the first and second ends of the second pipe, wherein at least a portion of the second pipe is configured to be received by at least a portion of the passageway of the first pipe; a first inner collar extending towards the pipe axis and proximate the first end of the first pipe, wherein the first inner collar comprises a seal structure located between the first pipe and the second pipe, wherein the seal structure comprises one or more sealing elements configured to provide a seal between the first and second pipes, wherein at least a portion of the first inner collar is positioned between the one or more sealing elements and the inner surface of the first pipe, and wherein a flange of the first inner collar extends radially over and in abutment with an outermost end of the first end of the first pipe and the seal structure is permanently positioned in abutment with the flange of the first inner collar; a second outer collar extending away from the pipe axis and proximate the second end of the second pipe; and a base coupling connected to one of the first and second ends of the at least two pipes, wherein the base coupling is configured for use in coupling the adjustable pipe to the second object, wherein the other of the first and second ends of the at least two pipes is configured for use in coupling the adjustable pipe to the first object.

16. The adjustable pipe of claim 15, wherein the base coupling defines a second end inner collar of the first pipe, wherein the second end inner collar of the first pipe extends towards the pipe axis and proximate the second end of the first pipe, wherein the second outer collar at the second end of the second pipe is configured to move within the first pipe, the second outer collar at the second end of the second pipe being stopped by contact with the second end inner collar of the first pipe.

17. The adjustable pipe of claim 15, wherein the one or more sealing elements of the seal structure comprises a first O-ring and a second O-ring, wherein a distance between the first O-ring of the seal structure and the second O-ring of the seal structure is fixed.

18. The adjustable pipe of claim 15, wherein the at least two pipes are configurable between a collapsed configuration and an extended configuration, wherein the at least two pipes extend a greater length along the pipe axis when in extended configuration than when in the collapsed configuration.

19. An adjustable pipe for fluid connection between a first object and a second object, wherein the adjustable pipe comprises: at least two pipes extending along a pipe axis between a first end and a second end, wherein the at least two pipes comprise: a first pipe extending between a first end and a second end, wherein the first pipe defines an inner surface and an outer surface opposite the inner surface, wherein the inner surface of the first pipe defines a passageway between the first and second ends of the first pipe, and a second pipe extending between a first end and a second end, wherein the second pipe defines an inner surface and an outer surface opposite the inner surface, wherein the inner surface of the second pipe defines a passageway between the first and second ends of the second pipe, wherein at least a portion of the second pipe is configured to be received by at least a portion of the passageway of the first pipe; a first inner collar extending towards the pipe axis and radially over an outermost end of the first end of the first pipe, and wherein the first inner collar is in abutment with the outermost end of the first end of the first pipe; a second outer collar extending away from the pipe axis and proximate the second end of the second pipe; a seal structure provided between the inner surface of the first pipe and the outer surface of the second pipe, wherein the seal structure is permanently positioned in abutment with the first inner collar and positioned between the first end of the first pipe and the second outer collar proximate the second end of the second pipe, wherein the seal structure defines an inner surface and an outer surface opposite the inner surface, wherein the inner surface of the seal structure faces the outer surface of the second pipe and the outer surface of the seal structure faces the inner surface of the first pipe, wherein two grooves are defined in the inner surface of the seal structure, wherein the seal structure comprises one or more sealing elements configured to provide a seal between the first and second pipes, wherein the one or more sealing elements of the seal structure comprise a first O-ring and a second O-ring, wherein each of the first and second O-rings of the seal structure is positioned in a different groove of the two grooves such that each of the first and second O-rings contact the outer surface of the second pipe; and a base coupling connected to one of the first and second ends of the at least two pipes, wherein the base coupling is configured for use in coupling the adjustable pipe to the second object, wherein the other of the first and second ends of the at least two pipes is configured for use in coupling the adjustable pipe to the first object.

20. The adjustable pipe of claim 19, wherein the base coupling defines a second end inner collar of the first pipe, wherein the second end inner collar of the first pipe extends towards the pipe axis and proximate the second end of the first pipe, wherein the second outer collar at the second end of the second pipe is configured to move within the first pipe, the second outer collar at the second end of the second pipe being stopped by contact with the second end inner collar of the first pipe.

21. The adjustable pipe of claim 19, wherein the at least two pipes are configurable between a collapsed configuration and an extended configuration, wherein the at least two pipes extend a greater length along the pipe axis when in extended configuration than when in the collapsed configuration.

* * * * *